United States Patent
Miyasaka

(10) Patent No.: US 11,028,536 B2
(45) Date of Patent: *Jun. 8, 2021

(54) DEFIBRATED MATERIAL MANUFACTURING DEVICE, AND SHEET MANUFACTURING APPARATUS

(71) Applicant: SEIKO EPSON CORPORATION, Tokyo (JP)

(72) Inventor: Yoichi Miyasaka, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/871,080

(22) Filed: May 11, 2020

(65) Prior Publication Data

US 2020/0270814 A1 Aug. 27, 2020

Related U.S. Application Data

(63) Continuation of application No. 16/048,579, filed on Jul. 30, 2018, now Pat. No. 10,676,867.

(30) Foreign Application Priority Data

Jul. 31, 2017 (JP) .............................. JP2017-148133

(51) Int. Cl.
*D21D 1/02* (2006.01)
*D21G 9/00* (2006.01)
(Continued)

(52) U.S. Cl.
CPC ............ *D21G 9/0009* (2013.01); *B27N 3/04* (2013.01); *D01G 25/00* (2013.01); *D04H 1/425* (2013.01);
(Continued)

(58) Field of Classification Search
USPC ....................................................... 162/252
See application file for complete search history.

(56) References Cited

U.S. PATENT DOCUMENTS 10,676,867 B2* 6/2020 Miyasaka .............. D01G 25/00
2014/0027075 A1 1/2014 Yamagami et al.
(Continued)

FOREIGN PATENT DOCUMENTS

JP 2012-144819 A 8/2012
JP 5590900 B2 9/2014
JP 2016-113712 A 6/2016

*Primary Examiner* — Mark Halpern
(74) *Attorney, Agent, or Firm* — Global IP Counselors, LLP

(57) ABSTRACT

A sheet manufacturing apparatus includes a defibrator configured to produce defibrated material, a feedstock supply unit, a monitoring device, and a cleaning device. The feedstock supply unit includes a conveyance device configured to convey feedstock, a storage device configured to accumulate the feedstock conveyed from the conveyance device and supply the feedstock to the defibrator, and a measuring device configured to measure a state of the feedstock accumulated on the storage device. The monitoring device is configured to predict stopping of conveyance of the feedstock by the feedstock supply unit and activate the cleaning device when a conveyance speed of the feedstock by the feedstock supply unit becomes slower than during normal operation. The cleaning device is configured to execute on at least one of the conveyance device and the storage device a cleaning process that preemptively prevents the stopping of conveyance.

8 Claims, 6 Drawing Sheets

(51) Int. Cl.
*D21B 1/04* (2006.01)
*D21F 13/00* (2006.01)
*D01G 25/00* (2006.01)
*D04H 1/425* (2012.01)
*D21B 1/08* (2006.01)
*B27N 3/04* (2006.01)
*D04H 1/4274* (2012.01)

(52) U.S. Cl.
CPC .............. *D04H 1/4274* (2013.01); *D21B 1/04* (2013.01); *D21B 1/08* (2013.01); *D21D 1/02* (2013.01); *D21F 13/00* (2013.01); *D21G 9/00* (2013.01)

(56) References Cited

U.S. PATENT DOCUMENTS

| | | |
|---|---|---|
| 2014/0374047 A1 | 12/2014 | Yamagami |
| 2016/0010278 A1 | 1/2016 | Yamagami et al. |
| 2016/0332333 A1 | 11/2016 | Yamagami et al. |
| 2017/0198434 A1 | 7/2017 | Yamagami |

\* cited by examiner

DEFIBRATED MATERIAL MANUFACTURING DEVICE, AND SHEET MANUFACTURING APPARATUS

CROSS-REFERENCE TO RELATED APPLICATIONS

This is a continuation application of U.S. patent application Ser. No. 16/048,579, filed on Jul. 30, 2018. This application claims priority to Japanese Patent Application No. 2017-148133 filed on Jul. 31, 2017. The entire disclosures of U.S. patent application Ser. No. 16/048,579 and Japanese Patent Application No. 2017-148133 are hereby incorporated herein by reference.

BACKGROUND

Technical Field

The present invention relates to a defibrated material manufacturing device for producing defibrated material suitable for manufacturing paper and other types of sheet products, and to a sheet manufacturing apparatus to which the defibrated material manufacturing device is disposed.

Related Art

JP-A-2016-113712 describes a sheet manufacturing apparatus configured to remove material that has accumulated on the conveyance mechanism by passing a cleaning member through the conveyance mechanism.

A problem with this device is that manufacturing sheets must be stopped when the cleaning member is passed through the conveyance mechanism, and the operation rate of the sheet manufacturing apparatus drops.

SUMMARY

The present invention is directed to solving at least part of the foregoing problem, and can be achieved by the embodiments or examples described below.

According to an aspect of the invention, a sheet manufacturing apparatus comprises a defibrator, a feedstock supply unit, a monitoring device, and a cleaning device. The defibrator is configured to defibrate feedstock containing fiber and produce defibrated material. The feedstock supply unit is configured to supply the feedstock to the defibrator and includes a conveyance device configured to convey feedstock, a storage device configured to accumulate the feedstock conveyed from the conveyance device and supply the feedstock to the defibrator, and a measuring device configured to measure a state of the feedstock accumulated on the storage device. The monitoring device is configured to predict stopping of conveyance of the feedstock by the feedstock supply unit and activate the cleaning device in response to a conveyance speed of the feedstock by the feedstock supply unit becoming slower than during normal operation. The cleaning device is configured to execute on at least one of the conveyance device and the storage device a cleaning process that preemptively prevents the stopping of conveyance.

According to the aspect of the invention, the cleaning device has a nozzle configured to discharge a fluid, and the cleaning device is configured to, as the cleaning process, discharge the fluid from the nozzle to at least one of the conveyance device and the storage device.

According to the aspect of the invention, the measuring device is configured to measure a weight of the feedstock accumulated on the storage device, and a time until the weight of the feedstock reaches a specific amount, and the monitoring device is configured to activate the cleaning device when the time exceeds a specific value.

According to the aspect of the invention, the measuring device is configured to measure a weight of feedstock newly accumulated on the storage device and time from when the feedstock is newly accumulated on the storage device, and the monitoring device is configured to activate the cleaning device when the weight of feedstock newly accumulated on the storage device has not reached a specific value when the time has passed a specific time.

According to the aspect of the invention, the feedstock supply unit includes a first feedstock supply unit and a second feedstock supply unit. When the monitoring device predicts stopping of conveyance in the first feedstock supply unit while the feedstock is being supplied to the defibrator by the first feedstock supply unit and the second feedstock supply unit, only the first feedstock supply unit is configured to stop supplying of the feedstock from the first feedstock supply unit, the cleaning device is configured to execute the cleaning process on the first feedstock supply unit, and then the first feedstock supply unit is configured to resume supplying the feedstock from the first feedstock supply unit. When the monitoring device predicts stopping of conveyance in the second feedstock supply unit while the feedstock is being supplied to the defibrator by the first feedstock supply unit and the second feedstock supply unit, only the second feedstock supply unit is configured to stop supplying of the feedstock from the second feedstock supply unit, the cleaning device is configured to execute the cleaning process on the second feedstock supply unit, and then the second feedstock supply unit is configured to resume supplying the feedstock from the second feedstock supply unit.

According to the aspect of the invention, the defibrated material manufacturing device further comprises a reporting device configured to report, after the cleaning process has been executed on the first feedstock supply unit and the supplying of the feedstock from the first feedstock supply unit has resumed, or after the cleaning process has been executed on the second feedstock supply unit and the supplying of the feedstock from the second feedstock supply unit has resumed, that a time exceeds a specific value when the time exceeds the specific value, or a weight of feedstock does not exceed a specific value when the weight of new feedstock stored on the storage device does not exceed the specific value when a specific time has passed.

According to the aspect of the invention, the feedstock supply unit includes a first feedstock supply unit and a second feedstock supply unit. When the monitoring device predicts stopping of conveyance in the first feedstock supply unit while the feedstock is being supplied to the defibrator by the first feedstock supply unit, the feedstock supply unit is configured to change to supplying of the feedstock to the defibrator by the second feedstock supply unit, and then execute the cleaning process on the first feedstock supply unit.

According to the aspect of the invention, when the monitoring device predicts stopping of conveyance in the second feedstock supply unit after changing to the supplying of the feedstock to the defibrator by the second feedstock supply unit, the feedstock supply unit is configured to change to supplying of the feedstock to the defibrator by the first feedstock supply unit on which the cleaning process has been executed, and then execute the cleaning process on the second feedstock supply unit.

According to the aspect of the invention, the feedstock includes recovered paper.

According to another aspect of the invention, a sheet manufacturing apparatus comprises a defibrator configured to defibrate feedstock containing fiber and produce defibrated material, a feedstock supply unit, an electronic controller, and a nozzle. The feedstock supply unit is configured to supply the feedstock to the defibrator and includes a vibration feeder configured to convey the feedstock, a storage hopper configured to accumulate the feedstock conveyed from the vibration feeder thereon, and supply the feedstock to the defibrator, and a load cell and an electronic timing device configured to measure a state of the feedstock accumulated on the storage hopper. The electronic controller is configured to predict stopping of conveyance of the feedstock by the feedstock supply unit and activate the nozzle in response to a conveyance speed of the feedstock by the feedstock supply unit becoming slower than during normal operation. The nozzle is configured to execute the cleaning process on at least the one of the vibration feeder and the storage hopper to preemptively prevent the stopping of conveyance.

According to still another aspect of the invention, a sheet manufacturing apparatus comprises the defibrated material manufacturing device according to the aspect of the invention described above.

According to this another aspect of the invention, the sheet manufacturing apparatus further comprises a mixing device configured to mix the defibrated material supplied from the defibrated material manufacturing device with resin, a web forming device configured to form a web from a mixture of the defibrated material and the resin, and a sheet forming device configured to form a sheet by a process including at least one of compressing and heating the web.

BRIEF DESCRIPTION OF THE DRAWINGS

Referring now to the attached drawings which form a part of this original disclosure.

DETAILED DESCRIPTION OF EXEMPLARY EMBODIMENTS

A preferred embodiment of the invention is described below with reference to the accompanying figures. Note that layers (levels) and parts are shown in the accompanying figures in sizes enabling easy recognition thereof, and differ from the actual scale of the actual layers (levels) and parts.

First Embodiment

Summary of a Sheet Manufacturing Apparatus

Figure 1:
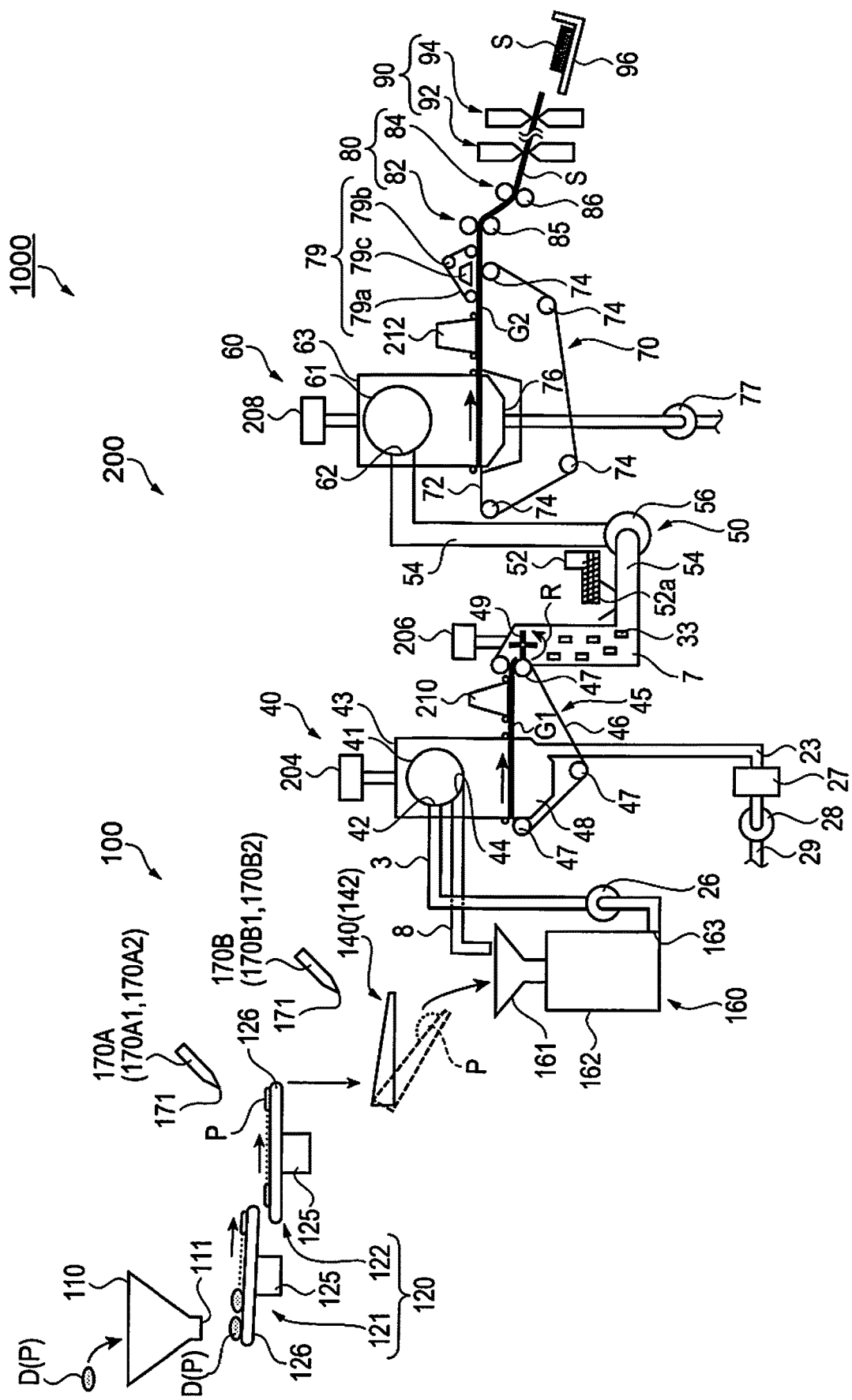
FIG. 1 schematically illustrates a configuration of a sheet manufacturing apparatus according to a first embodiment.

FIG. 1 schematically illustrates the configuration of a sheet manufacturing apparatus according to a first embodiment.

A sheet manufacturing apparatus 1000 according to this embodiment is described first with reference to FIG. 1.

The sheet manufacturing apparatus 1000 according to this embodiment produces new paper (cut sheets) by defibrating, in a dry process, recovered paper that has already been used, such as confidential documents, detangling the defibrated material into individual fibers, applying pressure and heat to form a web, and then cutting the web. By mixing various additives to the defibrated material resulting from defibrating recovered paper and detangling the fibers, the sheet manufacturing apparatus 1000 can also improve the strength and whiteness, and impart desired properties such as color, scent, and flame resistance, according to the intended application of the finished paper products. By controlling the density, thickness, and form of the paper, the sheet manufacturing apparatus 1000 can also produce paper of various thicknesses and sizes, including A4 and A3 size office paper, and business cards, according to the application.

As shown in FIG. 1, the sheet manufacturing apparatus 1000 includes a defibrated material manufacturing device 100 for defibrating feedstock such as shreds of paper (recovered paper) containing fiber into defibrated material, and a recycled paper manufacturing system 200 that produces new paper (sheets S) from the defibrated material.

The defibrated material manufacturing device 100 defibrates feedstock such as shreds of paper (recovered paper) containing fiber into defibrated material, and supplies the defibrated material to the recycled paper manufacturing system 200. The defibrated material is feedstock such as paper shreds (recovered paper) that has been broken down until the original shape is lost and is defibrated into individual fibers. Included in the defibrated material are the detangled fibers of the feedstock, and impurities (such as resins bonding fibers together, color agents such as ink and toner, bleeding inhibitors, strengthening agents, and other additives) that are separated from the fibers as the feedstock is defibrated.

The configuration of the defibrated material manufacturing device 100 is described in detail below.

The recycled paper manufacturing system 200 includes a screener 40 that classifies the defibrated material supplied from the defibrated material manufacturing device 100 based on the length of the fibers; a separator 45 that removes impurities from the defibrated material; a mixing device 50 that mixes resin with the defibrated material; a web forming device 70 that forms a web from the mixture of defibrated material and resin; and a sheet forming device 80 that forms a sheet S by applying either or both a compression process and a heating process to the web. More specifically, the recycled paper manufacturing system 200 has, disposed sequentially along the conveyance path through which the defibrated material and web are conveyed, the screener 40, the separator 45, a rotor 49, the mixing device 50, an air-laying device 60, the web forming device 70, a supply device 79, the sheet forming device 80, and a cutting device 90.

The sheet manufacturing apparatus 1000 according to this embodiment includes the defibrated material manufacturing device 100, the mixing device 50 that mixes the defibrated material supplied from the defibrated material manufacturing device 100 with resin, the web forming device 70 that forms a web (second web G2) from the mixture of defibrated material and resin, and the sheet forming device 80 that forms a sheet S by applying either or both a compression process and a heating process to the web (second web G2).

The recycled paper manufacturing system 200 also has wetting devices, 206, 208, 210, 212 for wetting the defibrated material and webs G1, G2, and/or the spaces through which the defibrated material and webs G1, G2 move.

The wetting devices 204, 206, 208 are evaporative or warm air vaporization humidifiers with a filter (not shown in the figure) that is wetted with water, and supply humidified air with a high humidity level by passing air through the wet filter.

The wetting device 210 and wetting device 212 are ultrasonic humidifiers, have a vibrator (not shown in the figure) that atomizes water, and supplies mist produced by the vibrator.

Note that the specific configuration of the wetting devices 204, 206, 208, 210, 212 may be designed as desired, and steam, evaporative, warm air vaporization, ultrasonic, or other type of humidification method may be used.

The defibrated material manufacturing device 100 and screener 40 are connected by a conduit 3, and a defibrator blower 26 is disposed to the conduit 3. The defibrated material produced by the defibrated material manufacturing device 100 is carried through the conduit 3 to the screener 40 by an air current produced by the defibrator blower 26.

The screener 40 has an inlet 42 into which the defibrated material defibrated by the defibrator 160 flows from the conduit 3 with the air current. The screener 40 classifies the defibrated material introduced from the inlet 42 based on fiber length. More specifically, the screener 40 separates the defibrated material defibrated by the defibrated material manufacturing device 100 into first screened material consisting of defibrated material of a, predetermined size or smaller, and second screened material consisting of defibrated material that is larger than the first screened material. The first screened material contains both fiber and particulate. The second screened material includes, for example, large fibers, undefibrated clumps (shreds that have not been sufficiently defibrated), and clumps of agglomerated or tangled defibrated threads.

The screener 40 has a drum 41, and a housing 43 enclosing the drum 41.

The drum 41 is a cylindrical sieve driven rotationally by a motor. The drum 41 has mesh (filter, screen), and functions as a sieve. By appropriately setting the size of the mesh, the drum 41 separates the defibrated material introduced from the inlet 42 into the first screened material that is smaller than the mesh openings, and the second screened material that is larger than the mesh. The mesh of the drum 41 may be a metal screen, expanded metal made by expanding a metal sheet with slits formed therein, or punched metal having holes formed by a press in a metal sheet, for example.

The defibrated material introduced from the inlet 42 is conveyed with the air current into the drum 41, and the first screened material drops through the mesh of the drum 41 as the drum 41 turns. The second screened material that cannot pass through the mesh of the drum 41 flows with the air current introduced from the inlet 42 to the drum 41 to an outlet 44, is conveyed through another conduit 8 and returned through the conduit 8 to the defibrator 160 of the defibrated material manufacturing device 100, and is defibrated again.

The first screened material classified by the drum 41 is dispersed in air through the mesh of the drum 41, and drops onto a mesh belt 46 of the separator 45 located below the drum 41.

The separator 45 includes the mesh belt 46 (sorting belt), rollers 47, and a suction device 48 (suction mechanism). The mesh belt 46 is an endless belt, is tensioned by three tension rollers 47, and moves in the direction indicated by the arrow in the figure by operation of the tension rollers 47. The surface of the mesh belt 46 is configured by mesh with openings of a specific size. Of the first screened material that drops from the drum 41, particulate of a size that passes through the mesh drops from the mesh belt 46, and fiber that is too large to pass through the mesh accumulates on the mesh belt 46, and is conveyed with the mesh belt 46 in the direction of the arrow.

The particulate that drops from the mesh belt 46 includes impurities that are not suited to manufacturing sheets S, including defibrated material that is relatively small or low in density (such as resin particulate, color agents, and other additives). More specifically, the separator 45 removes impurities from the first screened material that are not suited to manufacturing a sheet S. The remnants of the first screened material after impurities are removed by the separator 45 are material that is suited to manufacture a sheet S, and accumulates on the mesh belt 46, forming a first web 01.

Below the mesh belt 46 is disposed the suction device 48 that suctions air from below the mesh belt 46. Below the suction device 48 are disposed a dust collector 27 and a collection blower 28. The suction device 48 and dust collector 27 are connected by a conduit 23, and the dust collector 27 and collection blower 28 are connected by a conduit 29.

The collection blower 28 suctions air through the dust collector 27 and suction device 48. When the collection blower 28 suctions air through the dust collector 27 and suction device 48, particulate that has passed through the mesh of the mesh belt 46 is suctioned with the air, and is conveyed through the conduit 23 to the dust collector 27. The dust collector 27 separates and collects from the air current particulate that has pass through the mesh belt 46. Air discharged by the collection blower 28 passes through the conduit 29 and is discharged to the outside of the recycled paper manufacturing system 200.

The fiber of the first screened material from which impurities were removed accumulates on top of the mesh belt 46, forming a first web 01. The suction force of the collection blower 28 promotes formation of the first web G1 on the mesh belt 46 while impurities are also quickly removed.

Moist air is supplied by the wetting device 204 to the space enclosing the drum 41. This moist air wets the first screened material inside the screener 40. As a result, accretion of the first screened material on the mesh belt 46 by static electricity is reduced, and the first screened material can be easily separated from the mesh belt 46. Accretion of the first screened material by static electricity on the rotor 49 and the inside walls of the housing 43 can also be suppressed. In addition, impurities can be efficiently suctioned by the suction device 48.

Note that the configuration in the recycled paper manufacturing system 200 for screening and separating the defibrated material into the first screened material and the second screened material is not limited to a screener 40 with a drum 41. For example, a configuration that uses a classifier to classify defibrated material defibrated by the defibrated material manufacturing device 100 may be used. Examples of such a classifier include cyclone classifiers, elbow jet classifiers, and eddy classifiers. If such a classifier is used, the defibrated material can be selectively separated into the first screened material and the second screened material. In addition, a configuration that separates and removes impurities including relatively small or low density matter (such as resin particles, color agents, and other additives) from the defibrated material can be configured by using such a classifier. This enables a configuration that, for example, returns the second screened material to the defibrator 160 of the defibrated material manufacturing device 100, collects unwanted matter by the dust collector 27, and feeds the first screened material from which impurities have been removed to a conduit 54.

Air bearing mist is supplied to the conveyance path of the mesh belt 46 by the wetting device 210 downstream from the screener 40. The mist of water particles produced by the wetting device 210 supplies moisture to the first web G1. As a result, the water content of the first web G1 is adjusted and accretion of fiber to the mesh belt 46, for example, by static is suppressed.

The rotor 49 that breaks up the first web G1 accumulated on the mesh belt 46 is disposed on the downstream side of the mesh belt 46 in the conveyance direction of the first web G1. The first web G1 is separated from the mesh belt 46 and broken up by the rotor 49 at the position where the mesh belt 46 is returned to the upstream side by a roller 47.

The first web G1 is a soft web of accumulated fiber, and the rotor 49 detangles the fibers of the first web G1 into a form that can be easily mixed with resin by the mixing device 50 described below.

The rotor 49 may be configured as desired, and in this embodiment the rotor 49 has a rotor vane configuration of flat rotating blades. The rotor 49 is located at a position where the blades contact the first web G1 separated from the mesh belt 46. By rotation of the rotor 49 (for example, rotation in the direction indicated by the arrow R in the figure), the first web G1 separated and conveyed from the mesh belt 46 hits the blades of the rotor 49 and is broken up into fragments 33.

The rotor 49 is preferably positioned so that the blades of the rotor 49 do not contact the mesh belt 46. For example, if the distance between the tips of the blades of the rotor 49 and the mesh belt 46 is greater than or equal to 0.05 mm and less than or equal to 0.5 mm, the rotor 49 can efficiently fragment the first web G1 without damaging the mesh belt 46.

The fragments 33 cut by the rotor 49 drop through a conduit 7, and are carried to the mixing device 50 by the current flowing through the conduit 7.

Humidified air is supplied by the wetting device 206 to the space containing the rotor 49. As a result, the problem of fiber building up on the blades of the rotor 49 or the inside of the conduit 7 due to static can be suppressed. Furthermore, because air with a high humidity level is supplied to the mixing device 50 through the conduit 7, problems due to static can also be prevented in the mixing device 50.

The mixing device 50 has an additive supply device 52 that supplies an additive including resin, the conduit 54 that communicates with the conduit 7 and through which a current carrying the fragments 33 flows, and a mixing blower 56. As described above, the fragments 33 are fiber from which impurities have been removed from the first screened material. The mixing device 50 mixes an additive including resin with the fiber in the fragments 33.

In other words, the mixing device 50 mixes resin with defibrated material supplied from the defibrated material manufacturing device 100. While described further below, a process including at least one of compression and heating is applied to the mixture (second web G2) of resin and fiber (defibrated material) in the fragments 33 to manufacture a sheet S. To stabilize the quality of the sheet S, uniformly controlling the ratio of feedstock (defibrated material) and resin in the sheet S is important.

In the mixing device 50, an air current is produced by the mixing blower 56, and the fragments 33 and additive are mixed while being conveyed through the conduit 54. The fragments 33 are detangled into a finer fibrous state in the process of flowing through the conduit 7 and conduit 54.

The additive supply device 52 is connected to an additive cartridge (not shown in the figure) that stores the additive, and supplies the additive from the additive cartridge to the conduit 54. The additive supply device 52 temporarily stores an additive of powder or particulate inside the additive cartridge. The additive supply device 52 also has an outlet 52a that feeds the temporarily stored additive into the conduit 54.

Note that the additive cartridge may be configured to be removably installed to the additive supply device 52. The additive cartridge may also be configured so that additive can be replenished.

The outlet 52a includes a feeder (not shown in the figure) that feeds the additive stored in the additive supply device 52 to the conduit 54, and a shutter (not shown in the figure) that opens and closes the connection between the feeder and the conduit 54. When the shutter is closed, the path between the outlet 52a and conduit 54 is closed, and the supply of additive from the additive supply device 52 to the conduit 54 is stopped.

When the feeder of the outlet 52a is not operating, additive is not supplied from the outlet 52a to the conduit 54, but if there is negative pressure in the conduit 54, additive may flow through the conduit 54 even if the feeder of the outlet 52a is stopped. However, this flow of additive can be reliably stopped by closing the path that connects the feeder to the conduit 54 with the shutter.

The additive that the additive supply device 52 supplies includes resin for binding fibers. The resin contained in the additive is a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive may contain only a single material or a mixture, both of which may comprise multiple types of particulate each comprising a single or multiple materials. The additive supplied may also be a fibrous or powder form.

The resin contained in the additive melts when heated and binds multiple fibers together. As a result, the fibers in the mixture of fiber and resin are not bonded together until heated to the temperature at which the resin melts.

In addition to resin for binding fibers, and depending on the type of sheet being manufactured, the additive supplied from the additive supply device 52 may also include a coloring agent for coloring the fiber, an anti-blocking agent to prevent agglomeration of fibers and agglomeration of resin, or a flame retardant for making the fiber difficult to burn, for example. The additive not containing a coloring agent may be colorless or a color light enough to be considered colorless, or white.

The fragments 33 dropping through the conduit 7 and the additive supplied by the additive supply device 52 are pulled through the conduit 54 by the air current produced by the mixing blower 56, and pass through the mixing blower 56. The fiber in the fragments 33 and the additive are mixed by the air current produced by the mixing blower 56 and/or the action of a rotating part such as the blades of the mixing blower 56, and the mixture (a mixture of the first screened material and additive) is conveyed through the conduit 54 to the air-laying device 60.

The mechanism for mixing the fragments 33 (first screened material) and additive is not specifically limited, and may work by mixing with blades turning at high speed, or using rotation of a container similarly to a V blender, and the mechanism may be located before or after the mixing blower 56.

The air-laying device 60 deposits the first screened material (defibrated material defibrated by the defibrated material manufacturing device 100). More specifically, the mixture that has passed through the mixing device 50 is introduced from an inlet 62 to the air-laying device 60, and the air-laying device 60 detangles and disperses the tangled defibrated material (fiber) in air while the mixture precipitates. When the resin in the additive supplied from the additive supply device 52 is fibrous, the air-laying device 60 also detangles interlocked resin fibers. As a result, the air-laying device 60 can lay the mixture uniformly in the web forming device 70.

The air-laying device 60 has a drum 61 and a housing 63 that houses the drum 61. The drum 61 is a cylindrical sieve driven rotationally by a motor. The drum 61 has mesh (filter, screen), and functions as a sieve. Based on the size of the mesh, the drum 61 causes fiber and particles smaller than the size of the mesh (that pass through the mesh) to precipitate from the drum 61. The configuration of the drum 61 in this example is the same as the configuration of the drum 41 described above.

Note that the sieve of the drum 61 may be configured without functionality for selecting specific material. More specifically, the sieve used in the drum 61 means a device having mesh, and the drum 61 may cause all of the mixture introduced to the drum 61 to precipitate.

The web forming device 70 is disposed below the drum 61. The web forming device 70 accumulates the material precipitated from the air-laying device 60, forming a second web G2 as another example of a web. The web forming device 70 includes, for example, a mesh belt 72, tension rollers 74, and a suction mechanism 76.

The mesh belt 72 is an endless belt, is tensioned by multiple tension rollers 74, and by operation of the tension rollers 74 is driven in the direction indicated by the arrow in the figure. The mesh belt 72 may be metal, plastic, cloth, or nonwoven cloth. The surface of the mesh belt 72 is a screen with openings of a specific size. Of the fiber and particulate dropping from the drum 61, particulate of a size that passes through the mesh drops through the mesh belt 72, and fiber of a size that cannot pass through the openings in the mesh accumulates on the mesh belt 72 and is conveyed in the direction of the arrow with the mesh belt 72. The mesh belt 72 moves at a constant speed during the operation of making a sheet S.

In other words, the web forming device 70 forms the second web G2, which is an example of a web comprising a mixture of defibrated material and additive (resin).

The openings in the mesh of the mesh belt 72 are fine, and can be sized so that most of the fiber and particles dropping from the drum 61 does not pass through.

A suction mechanism 76 is disposed below the mesh belt 72 (on the opposite side as the air-laying device 60). The suction mechanism 76 includes a suction blower 77, and by the suction of the suction blower 77 produces a flow of air from the air-laying device 60 to the mesh belt 72.

The mixture distributed in air by the air-laying device 60 is pulled onto the mesh belt 72 by the suction mechanism 76. As a result, formation of the second web G2 on the mesh belt 72 is promoted, and the discharge rate from the air-laying device 60 can be increased. A downward air flow can also be created in the descent path of the mixture, and interlocking of defibrated material and additive during descent can be prevented, by the suction mechanism 76.

The suction blower 77 (air-laying suction device) may be configured to discharge from the recycled paper manufacturing system 200 air that has been suctioned from the suction mechanism 76 and has passed through a collection filter not shown. The suction blower 77 may push the suctioned air to the dust collector 27 to collect the impurities contained in the air suctioned by the suction mechanism 76.

Humidified air is supplied by the wetting device 208 to the space surrounding the drum 61. As a result, the inside of the air-laying device 60 can be humidified by the humidified air, fiber and particles accumulating on the housing 63 due to static electricity can be suppressed, fiber and particles can be made to precipitate quickly on the mesh belt 72, and a second web G2 of a desired form can be made.

A soft, fluffy second web G2 containing much air is thus formed by passing through the air-laying device 60 and web forming device 70. The second web G2 accumulated on the mesh belt 72 is then conveyed to the sheet forming device 80.

Air carrying mist is supplied by the wetting device 212 to the conveyance path of the mesh belt 72 on the downstream side of the air-laying device 60. As a result, mist generated by the wetting device 212 is supplied to the second web G2, and the water content of the second web G2 is adjusted. Accretion of fiber on the mesh belt 72 due to static electricity is also suppressed.

The supply device 79 that delivers the second web G2 on the mesh belt 72 to the sheet forming device 80 is also disposed on the downstream side of the conveyance path of the mesh belt 72. The supply device 79 includes, for example, a mesh belt 79a, rollers 79b, and a suction mechanism 79c.

The suction mechanism 79c includes a blower (not shown in the figure), and by the suction force of the blower produces an upward air current on the mesh belt 79a. This air current pulls the second web G2, and the second web G2 separates from the mesh belt 72 and sticks to the mesh belt 79a. The mesh belt 79a moves in conjunction with the rollers 79b, and conveys the second web G2 to the sheet forming device 80. In this example, the speed of the mesh belt 72 and the speed of the mesh belt 79a are the same.

In this way, the supply device 79 separates the second web G2 formed on the mesh belt 72 from the mesh belt 72, and conveys the second web G2 to the sheet forming device 80.

The sheet forming device 80 forms a sheet S from the precipitate (second web G2) deposited by the air-laying device 60. More specifically, the sheet forming device 80 forms a sheet S by compressing and heating the second web G2 delivered from the supply device 79. The sheet forming device 80, by applying heat to the fiber and additive contained in the second web G2, binds fibers in the mixture through the additive (resin).

The sheet forming device 80 has a compression device 82 that compresses the second web G2, and a heating device 84 that heats the second web G2 after being compressed by the compression device 82.

The compression device 82 in this example comprises a pair of calender rolls 85 that hold and compress the second web G2 with a specific nipping force. Calendering reduces the thickness of the second web G2 and increases the density of the second web G2. One of the pair of calender rolls 85 is a drive roller that is driven by a motor (not shown in the figure), and the other is a driven roller that turns in conjunction with the drive roller. The calender rolls 85 turn in response to the drive power from a motor (not shown in the figure), compress the second web G2, and convey a high density second web G2 resulting from compression to the heating device 84.

A heat roller (heating roller), hot press molding machine, hot plate, hot air blower, infrared heater, or flash fuser, for example, may be used as the heating device 84. In this embodiment, the heating device 84 comprises a pair of heat rollers 86. The heat rollers 86 are heated to a previously set temperature by a heater disposed internally or externally. The heat rollers 86 apply heat to both sides of the second web G2 compressed by the calender rolls 85, forming a sheet S. One of the pair of heat rollers 86 is a drive roller that is driven by a motor (not shown in the figure), and the other is a driven roller that turns in conjunction with the drive roller. The heat rollers 86 turn in response to the drive power from a motor (not shown in the figure), and convey sheet S formed from the second web G2 to the cutting device 90.

Note that the sheet forming device 80 is not limited to a configuration that forms a sheet S by applying pressure and heat to the second web G2, and may be a configuration that forms a sheet S by compressing the second web G2, or a configuration that forms a sheet S by heating the second web G2. In other words, the sheet forming device 80 may be any configuration that forms a sheet by a process including at least one of compressing and heating the second web G2 (web).

The cutting device 90 cuts and processes the sheet S formed by the sheet forming device 80 into sheets S of a specific size (cut sheets). More specifically in this example, the cutting device 90 has a first cutter 92 that cuts the sheet S crosswise to the conveyance direction of the sheet S, and a second cutter 94 that cuts the sheet S parallel to the conveyance direction. In this example, the second cutter 94 is located on the downstream side of the first cutter 92 in the conveyance direction of the sheet S. The sheet S formed by the sheet forming device 80 is cut by the first cutter 92 and second cutter 94 into single sheets of a specific size.

The cut sheets cut from the sheet S by the cutting device 90 are then discharged toward a tray 96, and stacked on the tray 96.

Summary of the Defibrated Material Manufacturing Device

Figure 2:
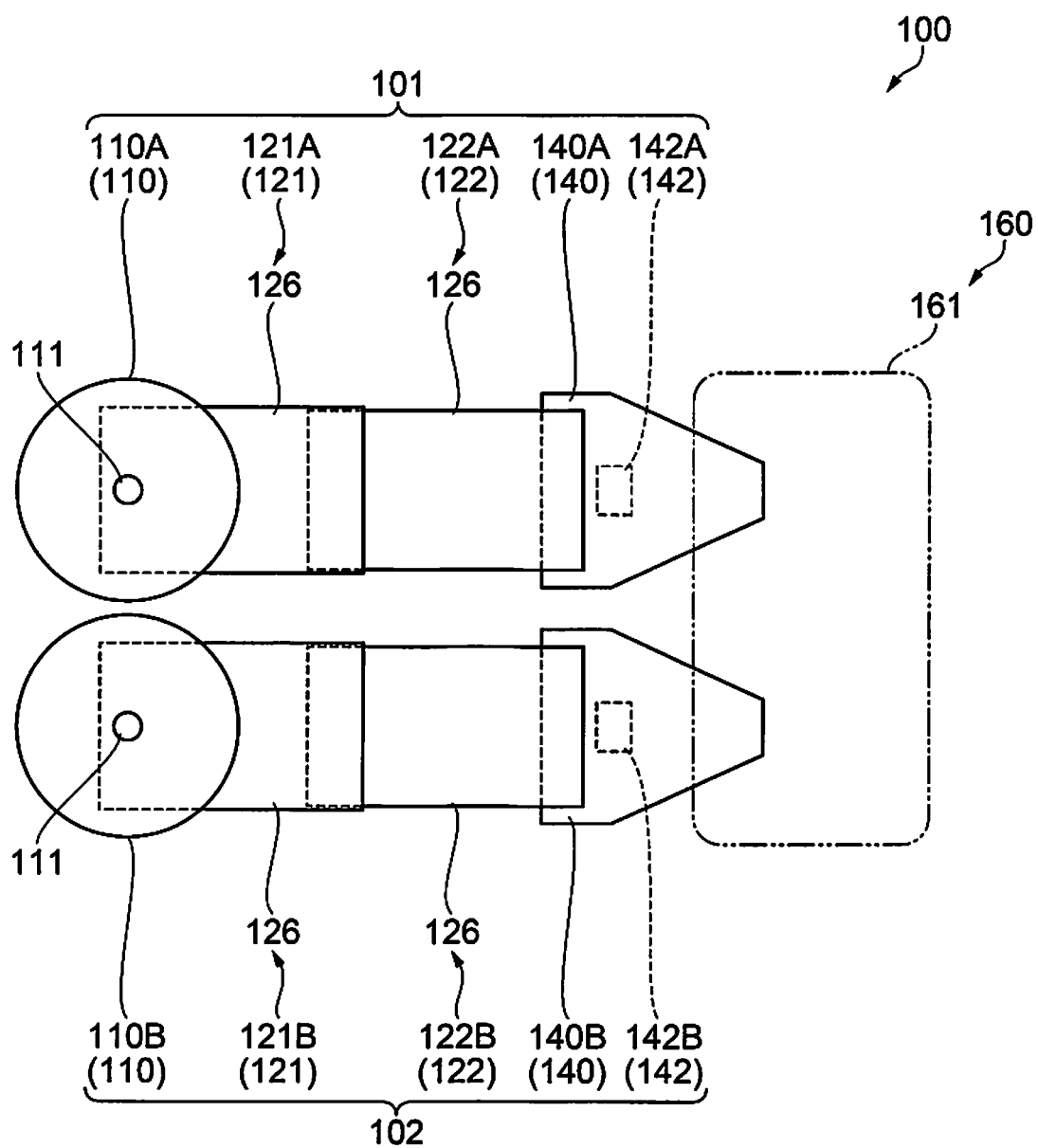
FIG. 2 is a schematic plan view of a feedstock supply unit of a defibrated material manufacturing device according to the first embodiment.
Figure 3:
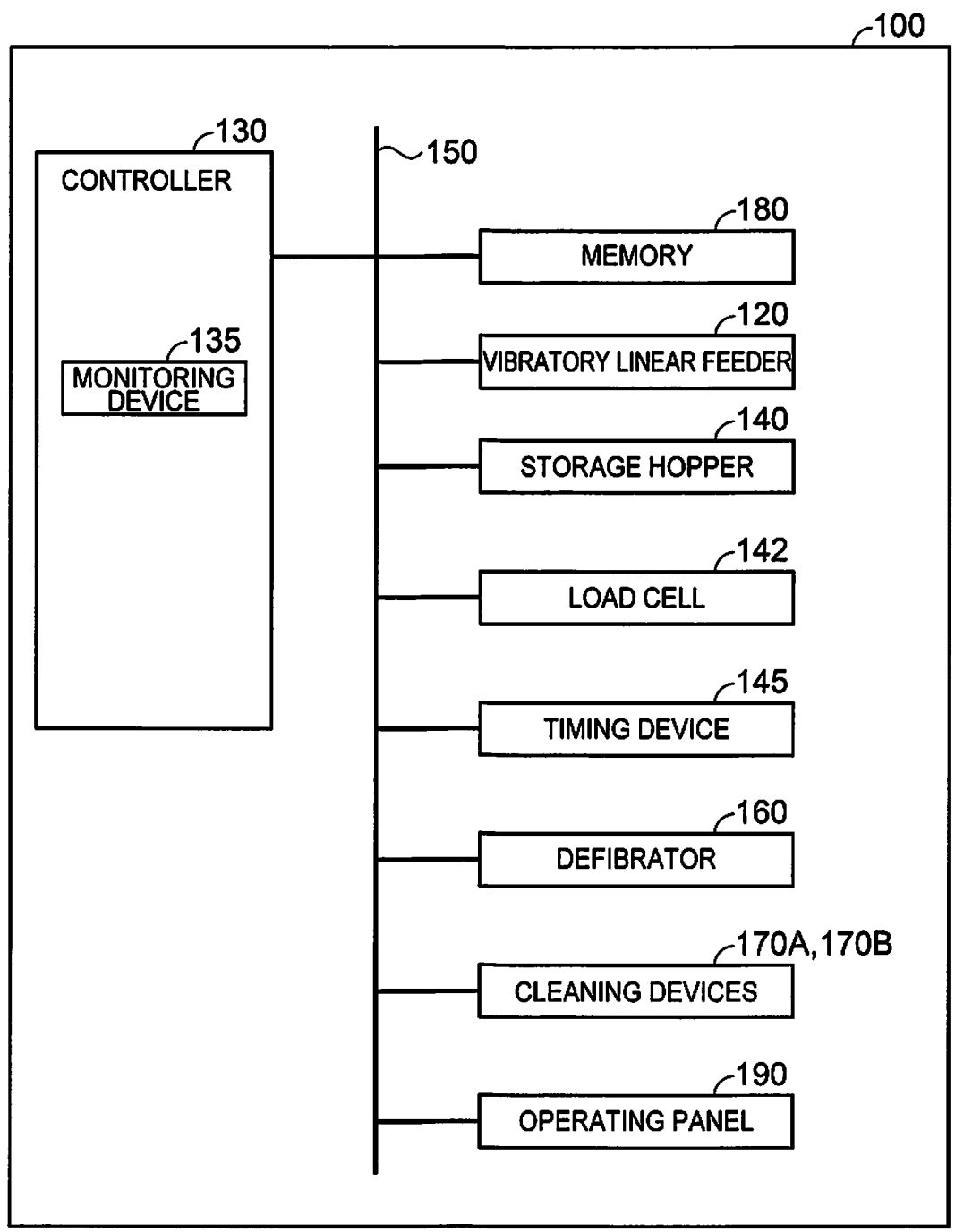
FIG. 3 is a block diagram of a control configuration of the defibrated material manufacturing device according to the first embodiment.

FIG. 2 is a plan view illustrating feedstock supply units 101, 102 of the defibrated material manufacturing device according to this embodiment. FIG. 3 is a block diagram illustrating a control configuration of the defibrated material manufacturing device according to this embodiment.

FIG. 2 shows the elements of the feedstock supply units 101, 102, and the input hopper 161 of the defibrator 160 is indicated by the dot-dot-dash line.

The general configuration of the defibrated material manufacturing device 100 is described next with reference to FIG. 1 to FIG. 3.

The defibrated material manufacturing device 100 according to this embodiment uses clumps (coarse product D) of paper shreds (shreds P) containing fiber as the feedstock, and defibrates the feedstock (coarse product D) into defibrated material. The feedstock that is defibrated into defibrated material is material containing fiber, and in addition to paper shreds (paper), may be pulp, pulp sheets, cloth, including nonwoven cloth, or textiles, for example.

As shown in FIG. 1, the defibrated material manufacturing device 100 according to this embodiment includes, disposed along the direction in which the feedstock is conveyed, an input hopper 110 into which material including fiber (coarse product D) is loaded; a vibratory linear feeder 120 that conveys the feedstock (coarse product D) by vibration; a storage hopper 140 that stores feedstock (shreds P defibrated from the coarse product D) conveyed from the vibratory linear feeder 120, and supplies feedstock to the defibrator 160; a load cell 142 that measures the shreds P stored in the storage hopper 140; and the defibrator 160 that defibrates the feedstock supplied from the storage hopper 140 into defibrated material.

Note that the vibratory linear feeder 120 is an example of a conveyance device in the embodiment. However, a conveyance device is not limited to the vibratory linear feeder 120. The conveyance device can be any type of a vibration feeder. For example, the conveyance device can be a rotary vibration feeder. The storage hopper 140 is an example of a storage unit, and the load cell 142 is an example of a measuring device in the embodiment.

The defibrated material manufacturing device 100 also has a cleaning device 170A disposed facing the surface on which feedstock is conveyed by the vibratory linear feeder 120, and a cleaning device 170B disposing facing the surface of the storage hopper 140 on which feedstock is stored. The cleaning devices 170A and 170B each have a nozzle 171 for discharging a gas, which is one example of a fluid. The cleaning devices 170A and 170B also have a moving mechanism (not shown in the figure); the cleaning device 170A can discharge gas to the entire surface of the vibratory linear feeder 120 on which the feedstock is conveyed; and the cleaning device 170B can discharge gas to the entire surface of the storage hopper 140 on which the feedstock is stored.

The coarse product D is clumps of shreds P containing fiber in multiple layers broken by a shredder or other type of grinder into pieces approximately 5 cm to 10 cm square. More specifically, the coarse product D are agglomerations of multiple shreds P. In this embodiment, the coarse product D formed by cutting feedstock with a shredder or other type of grinder are conveyed by a worker and loaded into the input hopper 110. The coarse product D loaded into the input hopper 110 is then discharged from the outlet 111 of the input hopper 110 onto a base 126 of the upstream vibratory linear feeder 121.

As described above, the defibrated material manufacturing device 100 in this embodiment does not include a shredder or other type of grinder, and coarse product D shredded by a device separate from the defibrated material manufacturing device 100 is loaded into the input hopper 110.

Note that shreds P, and the coarse product D that is an agglomeration of shreds P, are examples of feedstock.

The vibratory linear feeder 120 has an upstream vibratory linear feeder 121 on the upstream side of the conveyance direction, and a downstream vibratory linear feeder 122 on the downstream side of the conveyance direction. The upstream vibratory linear feeder 121 and downstream vibratory linear feeder 122 each have a drive device 125 and a base 126. The drive device 125 has an electromagnet (not shown in the figure) and a permanent magnet (not shown in the figure), and causes the base 126 to vibrate by changing the electromagnetic force produced by the electromagnet and permanent magnet.

The upstream vibratory linear feeder 121 and downstream vibratory linear feeder 122 convey the coarse product D loaded on the base 126 toward the storage hopper 140 by the vibration of the base 126.

More specifically, the upstream vibratory linear feeder 121 is disposed with the base 126 intersecting the horizontal plane. In other words, the upstream vibratory linear feeder 121 is disposed with the base 126 inclined relative to the horizontal plane with the input hopper 110 end higher than the downstream vibratory linear feeder 122 end. When the base 126 vibrates, the coarse product D on the base 126 moves in the direction in which the base 126 slopes (the direction from the input hopper 110 to the downstream vibratory linear feeder 122). The direction of movement (conveyance direction) and the speed of movement (conveyance speed) of the coarse product D on the base 126 is adjusted by the slope of the base 126. For example, if the slope of the base 126 is steep, the coarse product D on the base 126 is conveyed more quickly than when the slope of the base 126 is gradual.

The base 126 of the downstream vibratory linear feeder 122 is not inclined. However, and the base 126 is disposed horizontally. On the downstream vibratory linear feeder 122, coarse product D fed first from the upstream vibratory linear feeder 121 is conveyed by being pushed by the coarse product D fed next from the upstream vibratory linear feeder 121. More specifically, the coarse product D located on the downstream vibratory linear feeder 122 downstream in the conveyance direction is conveyed by being pushed by the coarse product D deposited on the upstream side in the conveyance direction, and is discharged toward the storage hopper 140.

For example, variation in the amount of feedstock conveyed per unit time occurs more easily when the base 126 of the downstream vibratory linear feeder 122 is inclined than when the base 126 of the downstream vibratory linear feeder 122 does not slope. This means that times when the amount of coarse product D conveyed is great, and times when the amount of coarse product D conveyed is little, can easily occur.

If a situation in which the amount of coarse product D conveyed by the downstream vibratory linear feeder 122 is sometimes great and the amount of coarse product D conveyed is sometimes little occurs, the amount of coarse product D supplied from the downstream vibratory linear feeder 122 to the storage hopper 140 will vary, and consistently conveying a specific amount of coarse product D at a specific rate from the storage hopper 140 to the defibrator 160 becomes difficult. As a result, in this embodiment, the base 126 of the downstream vibratory linear feeder 122 is not inclined so that coarse product D is consistently supplied at a constant speed from the downstream vibratory linear feeder 122 to the storage hopper 140 so that the amount of coarse product D supplied from the downstream vibratory linear feeder 122 to the storage hopper 140 does not vary.

The base 126 of the downstream vibratory linear feeder 122 is therefore preferably disposed on a horizontal plane so that a specific amount of coarse product D is consistently supplied at a specific speed from the storage hopper 140 to the defibrator 160.

The storage hopper 140 also has a load cell 142 that measures the shreds P stored in the storage hopper 140. The load cell 142 is a sensor that detects a force (weight, torque), and has a strain body that deforms proportionally to the force, and a strain gauge that measures the displacement (strain) of the strain body.

When a specific amount of shreds P (shreds P defibrated from the coarse product D) is measured by the load cell 142, the storage hopper 140 tips to an incline as indicated by the dotted line in FIG. 1, the specific amount of shreds P is discharged from the storage hopper 140 and is deposited as a feedstock of defibrated material into the input hopper 161 of the defibrator 160.

As shown in FIG. 2, this embodiment has two input hoppers 110, two upstream vibratory linear feeders 121, two downstream vibratory linear feeders 122, two storage hoppers 140, and two load cells 142. In other words, each of the feedstock supply units 101, 102 is a mechanical feedstock supplier and includes the input hopper 110, the upstream vibratory linear feeder 121, the downstream vibratory linear feeder 122, the storage hopper 140, and the load cell 142.

More specifically, the input hopper 110 comprises a first input hopper 110A and a second input hopper 110B; the upstream vibratory linear feeder 121 comprises a first upstream vibratory linear feeder 121A and a second upstream vibratory linear feeder 121B; the downstream vibratory linear feeder 122 comprises a first downstream vibratory linear feeder 122A and a second downstream vibratory linear feeder 122B; the storage hopper 140 comprises a first storage hopper 140A and a second storage hopper 140B; and the load cell 142 comprises a first load cell 142A and a second load cell 142B.

The first input hopper 110A, the first upstream vibratory linear feeder 121A, the first downstream vibratory linear feeder 122A, and the first storage hopper 140A embody the first feedstock supply unit 101 that supplies a feedstock of defibrated material (coarse product D) to the defibrator 160. The second input hopper 110B, the second upstream vibratory linear feeder 121B, the second downstream vibratory linear feeder 122B, and the second storage hopper 140B embody the second feedstock supply unit 102 that supplies a feedstock of defibrated material (coarse product D) to the defibrator 160.

Note that while not shown in FIG. 2, the feedstock supply units 101 and 102 also have a timing device 145 (see FIG. 3).

In this embodiment, a specific amount of shreds P (feedstock of defibrated material) is not supplied simultaneously to the defibrator 160 from both the first feedstock supply unit 101 and second feedstock supply unit 102, and instead a specific amount of shreds P is alternately supplied to the defibrator 160. More specifically, a specific amount of shreds P is supplied to the defibrator 160 at a specific interval (specific speed) by the first feedstock supply unit 101 and second feedstock supply unit 102.

More specifically, a specific amount of shreds P is supplied from the first feedstock supply unit 101 to the defibrator 160 at a 6 second interval, and a specific amount of shreds P is supplied from the second feedstock supply unit 102 to the defibrator 160 at a 6 second interval. In addition, because a specific amount of shreds P is alternately supplied to the defibrator 160 from the first feedstock supply unit 101 and second feedstock supply unit 102, a specific amount of shreds P is alternately supplied to the defibrator 160 from the feedstock supply units 101 and 102 every 3 seconds.

Furthermore, as shown in FIG. 1, the cleaning device 170A includes a first cleaning device 170A1 facing the feedstock conveyance surfaces of the first upstream vibratory linear feeder 121A and first downstream vibratory linear feeder 122A, and a second cleaning device 170A2 facing the feedstock conveyance surfaces of the second upstream vibratory linear feeder 121B and the second downstream vibratory linear feeder 122B.

The cleaning device 170B includes a first cleaning device 170B1 facing the feedstock storage surface of the first storage hopper 140A, and a second cleaning device 170B2 facing the feedstock storage surface of the second storage hopper 140B.

Gas is discharged from the nozzles 171 of the first and second cleaning devices 170A1, 170B1 to the first feedstock supply unit 101, and gas is discharged from the nozzles 171 of the first and second cleaning devices 170A2, 170B2 to the second feedstock supply unit 102.

As described above, to supply a specific amount of shreds P as defibrated feedstock at a constant rate from the storage hopper 140 to the defibrator 160, the base 126 of the downstream vibratory linear feeder 122 is preferably disposed on a horizontal plane. By disposing the base 126 of the downstream vibratory linear feeder 122 horizontally, the conveyance speed of the downstream vibratory linear feeder 122 is slower than when the base 126 of the downstream vibratory linear feeder 122 is disposed intersecting the horizontal. As a result, the processing time required for the feedstock supply units 101 and 102 to produce a specific amount of defibrated feedstock is slower (longer) than the time required for the defibrator 160 to produce defibrated material, and the processing capacity of the feedstock supply units 101 and 102 is lower than the processing capacity of the defibrator 160.

This embodiment has the two feedstock supply units 101, 102 that supply feedstock for defibrated material to the defibrator 160, and compared with a configuration having only one feedstock supply unit, the processing capacity of the feedstock supply units is greater and equal to the processing capacity of the defibrator 160. In other words, the number of feedstock supply units is set so that the processing capacity of the feedstock supply units is equal to the processing capacity of the defibrator 160.

When the coarse product D is conveyed by vibration by the upstream vibratory linear feeder 121 and downstream vibratory linear feeder 122, the coarse product D, which is clumps of many shreds P, is defibrated into individual shreds P.

More specifically, when the coarse product D, which is clumps of many shreds P, is conveyed by vibration, a force that defibrates the many shreds P is applied by the vibration to the coarse product D. In other words, while the coarse product D is conveyed by the upstream vibratory linear feeder 121 and downstream vibratory linear feeder 122, a force defibrating the many shreds P works on the coarse product D due to the vibrations. As a result, when the coarse product D is conveyed by the upstream vibratory linear feeder 121 and downstream vibratory linear feeder 122, the coarse product D, which is clumps of many shreds P, is gradually defibrated, and on the downstream side in the conveyance direction of the downstream vibratory linear feeder 122, the coarse product D is defibrated into individual shreds P.

When the coarse product D is conveyed by the upstream vibratory linear feeder 121 and downstream vibratory linear feeder 122, the vibrating strength of the vibratory linear feeders 121, 122, and the length of the vibratory linear feeders 121, 122 in the conveyance direction, are set so that force defibrating the coarse product D into individual shreds P works sufficiently on the coarse product D. As a result, when the coarse product D is conveyed by the vibratory linear feeders 121, 122, the coarse product D, which is clumps of many shreds P, is defibrated.

In this way, the coarse product D loaded onto the base 126 of the vibratory linear feeder 120 (vibratory linear feeders 121, 122) is conveyed by vibration, and is defibrated by the vibrations into individual shreds P. The shreds P defibrated from the coarse product D are then discharged as a feedstock of defibrated material from the downstream vibratory linear feeder 122. The shreds P discharged from the downstream vibratory linear feeder 122 drop in the direction of gravity, and are supplied to the storage hopper 140.

The weight of the shreds P accumulated on the storage hopper 140 is weighed by the load cell 142, and when the weight of the shreds P on the storage hopper 140 reaches a specific level, a specific amount (specific weight) of shreds P is supplied from the storage hopper 140 to the input hopper 161 of the defibrator 160.

The defibrator 160 has an input hopper 161, a main unit 162, and an outlet 163.

The input hopper 161 stores and supplies to the main unit 162 a specific amount (specific weight) of shreds P.

The main unit 162 may be an impeller mill, for example, comprising a rotor (not shown in the figure) that turns at high speed, and a liner (not shown in the figure) position around the outside of the rotor. The shreds P go between the rotor and the liner of the main unit 162, are ground by the relative rotation of the rotor and the liner, and defibrated into individual fibers. The main unit 162 produces an air current by rotation of the rotor. By this air current the main unit 162 suctions the shreds P, which is the feedstock, from the input hopper 161, and conveys the defibrated material resulting from defibrating the shreds P into individual fibers to the outlet 163.

In other words, the defibrated material is delivered from the outlet 163 to the conduit 3 as feedstock for a sheet S, and is supplied through the conduit 3 to the recycled paper manufacturing system 200.

The defibrator 160 receives a specific amount of shreds P from the storage hopper 140 at a specific rate as defibrated material feedstock, and defibrates the shreds P into individual fibers (defibrated material). A specific amount of defibrated material is also supplied at a constant rate as sheet S feedstock from the defibrator 160 to the recycled paper manufacturing system 200. Because the recycled paper manufacturing system 200 receives a specific amount of defibrated material (feedstock for a sheet S) at a constant speed from the defibrator 160, the recycled paper manufacturing system 200 can consistently manufacture a sheet S of a specific density or specific thickness.

If the weight or the supply rate of the defibrated material received from the defibrator 160 varies, the density or thickness of the sheet S manufactured by the recycled paper manufacturing system 200 will also vary. As a result, the weight and supply speed of the defibrated material (feedstock for a sheet S) supplied from the defibrated material manufacturing device 100 to the recycled paper manufacturing system 200 are preferably constant.

As described above, to stabilize the quality of the sheet S manufactured by the recycled paper manufacturing system 200, maintaining a constant ratio of the sheet S feedstock (defibrated material) and resin ratio in the mixing device 50 is important. As a result, the feedstock (defibrated material) of the sheet S is preferably measured before the sheet S feedstock (defibrated material) reaches the mixing device 50, so that a specific amount of sheet S feedstock is supplied to the mixing device 50.

Because the volume increases greatly when the shreds P are defibrated into individual fibers, if the amount of sheet S feedstock is measured after defibration into individual fibers, the configuration of elements used to measure the feedstock of the sheet S increases in size. However, by measuring the feedstock of the sheet S before defibration into individual fibers, the configuration of elements used to measure the feedstock of the sheet S can be compactly configured.

As a result, a configuration that measures the feedstock of the sheet S before being defibrated into individual fibers, that is, a configuration for measuring the feedstock of the sheet S (shreds P) by means of the storage hopper 140 and the load cell 142 disposed upstream in the conveyance direction from the defibrator 160, is preferable.

As shown in FIG. 3, the defibrated material manufacturing device 100 includes a controller (electronic controller) 130, a memory 180, the vibratory linear feeder 120, the storage hopper 140, the load cell 142, the timing device 145, the defibrator 160, the first and second cleaning devices 170A and 170B, and an operating panel 190.

The controller 130, the memory 180, the vibratory linear feeder 120, the storage hopper 140, the load cell 142, the timing device 145, the defibrator 160, the cleaning devices 170A and 170B, and the operating panel 190 are communicatively connected through a bus 150.

The timing device 145 is an example of a measuring device, and in this example the timing device 145 measures time. The timing device 145 can be an electronic timing device.

The operating panel 190 in this embodiment is a display panel such as a liquid crystal display panel. The liquid crystal display panel can include a touch panel mechanism. The operating panel 190 is not limited to the liquid crystal display panel, and can be any type of display such as a light emitting diode display, and the like. The operating panel 190 sets specific conditions required for the operation of the defibrated material manufacturing device 100. While described further below, the operating panel 190 is an example of a reporting device, displays the status of the defibrated material manufacturing device 100, and reports the status of the defibrated material manufacturing device 100 to the operator.

The memory 180 comprises, for example, ROM readably storing specific information, and RAM rewritably storing information.

The controller 130 has a monitoring device 135 as a function unit embodied by software (a program) stored in memory 180. The controller 30 includes, for example, a processor such as a central processing unit (CPU) (not illustrated), a read-only memory (ROM), a random access memory (RAM), and a nonvolatile memory. The processor includes one or a plurality of CPUs, one or a plurality of application-specific integrated circuits (ASICs), or can be formed by a combination of these components.

In response to commands input by the operating panel 190, the controller 130 controls other parts of the defibrated material manufacturing device 100.

More specifically, the controller 130 controls the vibratory linear feeder 120 so that coarse product D (shreds P) supplied from the input hopper 110 are conveyed toward the storage hopper 140. The controller 130 gets the weight of the shreds P loaded on the storage hopper 140 from the load cell 142, and when the weight of the shreds P reaches a specific amount (weight W1), tilts the storage hopper 140 to discharge the specific amount of shreds P from the storage hopper 140 into the input hopper 161 of the defibrator 160. The controller 130 also controls the defibrator 160 so that the shreds P loaded into the input hopper 161 is defibrated to defibrated material, and the defibrated material is supplied to the recycled paper manufacturing system 200.

The recycled paper manufacturing system 200 in this example produces sixteen A4-size sheets S per minute. In addition, the weight of one A4-size sheet S is 4 g (grammage=60-80 g/m2). For the recycled paper manufacturing system 200 to manufacture sixteen A4-size sheets S per minute, the defibrated material manufacturing device 100 must supply defibrated material as the feedstock of the sheet S to the recycled paper manufacturing system 200 at the rate of 64 g (4 g×16 sheets) per minute.

Furthermore, because shreds P (the feedstock of the defibrated material) are supplied from the feedstock supply units 101 and 102 to the defibrator 160 every six seconds, for the defibrated material manufacturing device 100 to supply defibrated material as the feedstock of the sheet S to the recycled paper manufacturing system 200 at the rate of 64 g per minute, the feedstock supply units 101 and 102 must each supply to the defibrator 160 3.2 g of shreds P every six seconds as the feedstock of the defibrated material.

Note that the values cited above are values (values for ideal conditions) supposing there is no loss in the defibrated material manufacturing device 100 and the recycled paper manufacturing system 200. In actual use, however, there is loss during processing by the defibrated material manufacturing device 100 and the recycled paper manufacturing system 200. In addition, this loss may vary with the type of coarse product D (shreds P), the production conditions of the defibrated material manufacturing device 100, and the production conditions of the recycled paper manufacturing system 200.

The controller 130 controls parts of the defibrated material manufacturing device 100 to correct these values considering the potential losses so that the sheet manufacturing apparatus 1000 can produce sixteen A4-size sheets S per minute.

The following description supposes there is no loss in the defibrated material manufacturing device 100 or recycled paper manufacturing system 200. In addition, because the feedstock supply units 101 and 102 are configured identically, the first feedstock supply unit 101 is described in detail below while description of the second feedstock supply unit 102 is omitted.

Figure 4:
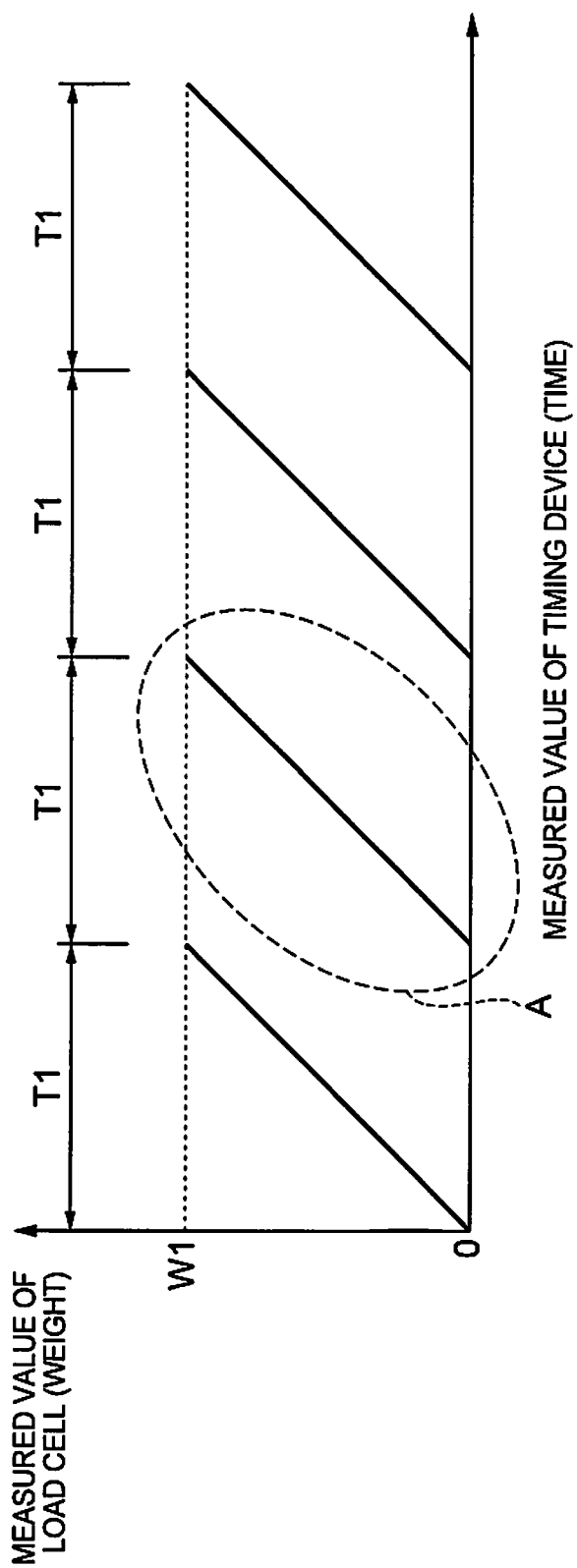
FIG. 4 is a graph of a relationship between a measurement of a load cell and a measurement of a timing device of the feedstock supply unit.

FIG. 4 is a graph illustrating the relationship between a measurement (weight) taken by the load cell of the feedstock supply unit, and a measurement (time) taken by the timing device. FIG. 4 supposes that the first feedstock supply unit 101 supplies 3.2 g of shreds P every six seconds as the feedstock of the defibrated material to the defibrator 160.

The Y-axis in FIG. 4 shows the measurement taken by the load cell 142, and more specifically shows the weight of the shreds P collected on the storage hopper 140. In FIG. 4, the weight W1 is 3.2 g. The value shown on the Y-axis in FIG. 4 does not include the weight of the storage hopper 140 itself.

The X-axis in FIG. 4 shows the measurement of the timing device 145, and denotes time. Time T1 in the figure is 6 seconds.

As shown in FIG. 4, when the shreds P accumulates at a constant speed in the first storage hopper 140A, the measurement of the first load cell 142A increases from 0 to weight W1 (3.2 g). Because the shreds P are supplied from the first storage hopper 140A to the defibrator 160 when the measurement of the first load cell 142A reaches W1, the measurement of the first load cell 142A returns to 0. Shreds P then continue accumulating in the first storage hopper 140A, and the measurement of the load cell 142A increases from 0 to weight W1. When the measurement of the load cell 142A reaches W1, the shreds P are again supplied from the first storage hopper 140A to the defibrator 160 and the measurement of the first load cell 142A again returns to 0.

Collection of the shreds P and discharging a specific amount (weight W1) of shreds P by the first storage hopper 140A thus repeats. The time required for the specific amount (weight W1) of shreds P to accumulate in the first storage hopper 140A, and the interval at which the specific amount (weight W1) of shreds P is discharged from the first storage hopper 140A, are both time T1 (6 seconds). In other words, weight W1 of shreds P is supplied (discharged) as the feedstock of the defibrated material at interval T1 from the first storage hopper 140A to the defibrator 160 by the first feedstock supply unit 101.

The coarse product D produced by cutting or milling in a shredder or other type of grinder may also contain chaff (paper dust) from the shredding process, impurities (such as resins bonding fibers together, color agents such as ink and toner, bleeding inhibitors, strengthening agents, and other additives) that are separated during shredding, or foreign matter of a material other than shreds P.

When the first feedstock supply unit 101 becomes soiled by such paper dust or other undesirable foreign matter, conveyance of the coarse product D or shreds P through the first feedstock supply unit 101 may be inhibited, and conveyance of the coarse product D or shreds P may stop.

Below, interference with conveyance of coarse product D or shreds P in the first feedstock supply unit 101 due to paper dust or other undesirable foreign matter is referred to as conveyance stopping at the first feedstock supply unit 101; interference with conveyance of coarse product D or shreds P in the vibratory linear feeders 121A, 122A due to paper dust or other undesirable foreign matter is referred to as conveyance stopping at the vibratory linear feeders 121A, 122A; and interference with discharge of shreds P by the first storage hopper 140A is referred to as conveyance stopping at the first storage hopper 140A.

Paper dust or other undesirable foreign matter is also referred to as contaminants.

More specifically, when contaminants are carried to the surface of the first upstream and downstream vibratory linear feeders 121A, 122A on which feedstock is conveyed (referred to below as the conveyance surface), and the conveyance surface of the vibratory linear feeders 121A, 122A becomes soiled, conveyance of coarse product D or shreds P by the vibratory linear feeders 121A, 122A gradually becomes difficult, and the conveyance speed of coarse product D or shreds P by the vibratory linear feeders 121A, 122A slows. In addition, when soiling of the conveyance surface of the vibratory linear feeders 121A, 122A becomes more severe, clumps of coarse product D or shreds P form on the conveyance surface of the vibratory linear feeders 121A, 122A, and conveyance of the feedstock by the vibratory linear feeders 121A, 122A may stop.

When such soiling by contaminants occurs, the conveyance speed of the vibratory linear feeders 121A, 122A slows, the supply rate of shreds P from the vibratory linear feeders 121A, 122A to the first storage hopper 140A slows. Accordingly, it becomes difficult for the first storage hopper 140A to supply the specific amount (weight W1) of shreds P to the defibrator 160 at the specified interval (time T1). When this happens, the supply of defibrated material per unit time from the defibrated material manufacturing device 100 to the recycled paper manufacturing system 200 decreases, and problems such as a change in the quality (thickness, density) of the sheet S the recycled paper manufacturing system 200, or a drop in the throughput of the recycled paper manufacturing system 200, easily occur.

In addition, if soiling by contaminants becomes excessive, conveyance by the vibratory linear feeders 121A, 122A may stop, supply of shreds P from the vibratory linear feeders 121A, 122A to the first storage hopper 140A stops, and supply of shreds P from the first storage hopper 140A to the defibrator 160 stops. When this happens, defibrated material is not supplied from the defibrated material manufacturing device 100 to the recycled paper manufacturing system 200, which causes problems such as the recycled paper manufacturing system 200 becomes unable to produce a sheet S.

To suppress such problems, when conveyance of feedstock by the vibratory linear feeders 121A, 122A stops in the related art, the operator must stop the defibrated material manufacturing device 100, remove the paper jam (clumps of coarse product D or shreds P), and perform a cleaning process that removes the contaminants from the conveyance surface of the vibratory linear feeders 121A, 122A.

Furthermore, when conveyance stops at the storage hopper 140, the operator must stop the defibrated material manufacturing device 100, remove the paper jam (clumps of shreds P) in the storage hopper 140, and perform a cleaning process that removes the contaminants from the surface of the storage hopper 140 on which shreds P collect.

When the defibrated material manufacturing device 100 stops operating for this cleaning process, the recycled paper manufacturing system 200 cannot manufacture a sheet S, and the productivity (such as the operation rate) of the sheet manufacturing apparatus 1000 drops.

In this embodiment, however, the cleaning process that resolves the problem of conveyance stopping is not performance manually after conveyance stops in the vibratory linear feeders 121A, 122A. Instead, this embodiment has the extremely useful ability to predict when conveyance may stop in the vibratory linear feeders 121A, 122A, automatically execute a cleaning process to preemptively prevent conveyance stopping before conveyance by the vibratory linear feeders 121A, 122A stops, and thereby suppress the adverse effects of the cleaning process (such as a drop in the operation rate, or a drop in quality).

This described further below.

Figure 5:
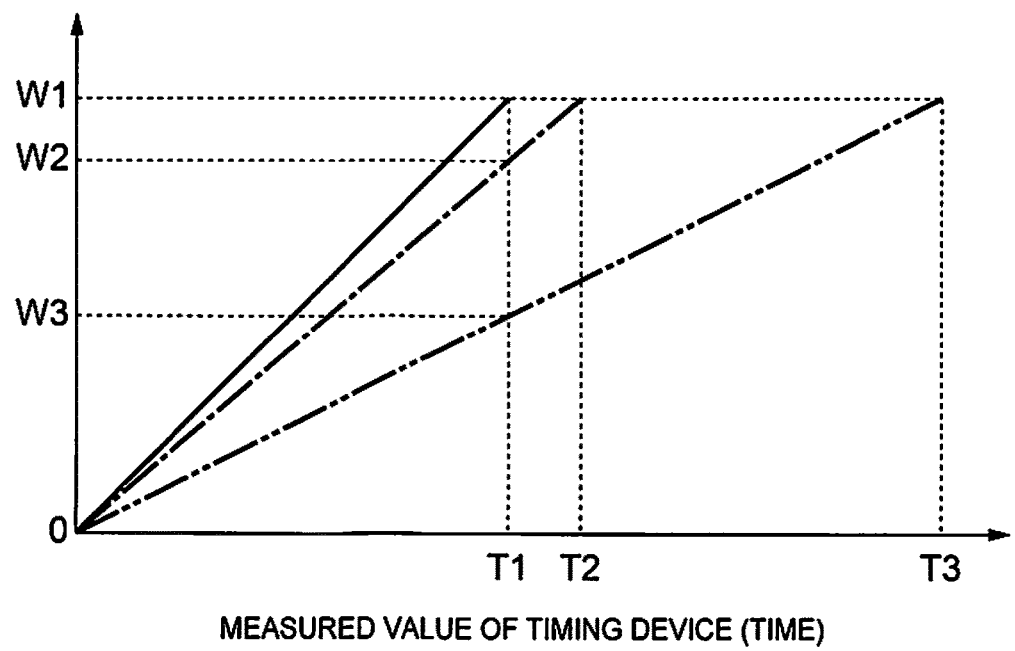
FIG. 5 is a graph of area A indicated by the dotted line in FIG. 4.

FIG. 5 is a graph of area A indicated by the dotted line in FIG. 4. In FIG. 5, the bold solid line indicates normal conveyance of shreds P by the vibratory linear feeders 121A, 122A, and the bold dot-dash line and the bold dot-dot-dash line indicate when conveyance of shreds P by the vibratory linear feeders 121A, 122A is not normal. In addition, the bold dot-dash line indicates when deviation from normal conveyance of shreds P is slight, and the bold dot-dot-dash line indicates when deviation from normal conveyance of shreds P is severe.

Note that the state indicated by the bold dot-dash line in the figure, that is, when deviation from normal conveyance of shreds P is slight, is an example of when stopping of conveyance is predicted.

As indicated by the bold solid line in FIG. 5, when the conveyance surface of the vibratory linear feeders 121A, 122A is not soiled and conveyance of shreds P by the vibratory linear feeders 121A, 122A is normal, a new load of the specific amount (weight W1) of shreds P accumulates on the first storage hopper 140A when the specified time (time T1) has passed. The time required for the specific amount (weight W1) of shreds P to accumulate on the first storage hopper 140A is the specified time (T1).

Note that time T1 is an example of the time until the weight of the feedstock reaches a specific amount, and an example of a specific time. The weight W1 is an example of the weight of new feedstock accumulated on the first storage hopper 140A when the specific time has passed, and an example of a specific amount. The new feedstock is feedstock that is newly accumulated on the first storage hopper 140A from a time point at which weight is zero in FIG. 5, for example, after the first storage hopper 140A discharges the specific amount of shreds P from the first storage hopper 140 into the input hopper 161 of the defibrator 160.

As indicated by the bold dot-dash line in FIG. 5, when soiling of the conveyance surface of the vibratory linear feeders 121A, 122A is slight and conveyance of shreds P by the vibratory linear feeders 121A, 122A deviates slightly from normal, the conveyance speed of shreds P by the vibratory linear feeders 121A, 122A slows, and the specific amount (weight W1) of shreds P does not accumulate on the first storage hopper 140A by the time the specified time (T1) has passed. As a result, when the specified time (T1) has passed, the weight W2 of the new shreds P accumulated on the first storage hopper 140A is lighter than the specific amount (weight W1). In addition, the time T2 until the specific amount (weight W1) of shreds P accumulates on the first storage hopper 140A is greater than the specified time (T1).

Note that time T2 is an example of the time until the weight of the feedstock reaches the specific amount, and an example of a specific value. Weight W2 is an example of a weight of new feedstock accumulated on the first storage hopper 140A when the specific time has passed, and an example of a specific value.

As indicated by the bold dot-dot-dash line in FIG. 5, when soiling of the conveyance surface of the vibratory linear feeders 121A, 122A is significant and conveyance of shreds P by the vibratory linear feeders 121A, 122A deviates significantly from normal, the conveyance speed of shreds P by the vibratory linear feeders 121A, 122A slows even more, and the specific amount (weight W1) of shreds P does not accumulate on the first storage hopper 140A by the time the specified time (T1) has passed. As a result, when the specified time (T1) has passed, the weight W3 of the new shreds P accumulated on the first storage hopper 140A is lighter than the specific amount (weight W1) and weight W2. In addition, the time T3 until the specific amount (weight W1) of shreds P accumulates on the first storage hopper 140A is greater than the specified time (T1) and time T2.

Note that time T3 is an example of the time until the weight of the feedstock reaches the specific amount. Weight W3 is an example of a weight of new feedstock accumulated on the storage hopper when the specific time has passed.

As described above, when conveyance of shreds P by the vibratory linear feeders 121A, 122A deviates from the normal, the weight of new shreds P accumulated on the first storage hopper 140A is lighter than normal when the specified time (T1) has passed, and the time required for the specific amount (weight W1) of shreds P to accumulate on the first storage hopper 140A increases.

Therefore, by evaluating the weight of new shreds P accumulated on the first storage hopper 140A, or the time required for the specific amount (weight W1) of shreds P to accumulate on the first storage hopper 140A, when the specified time (T1) has passed, change from a state of normal to a state of non-normal conveyance of shreds P by the vibratory linear feeders 121A, 122A can be determined, the degree of deviation from normal conveyance by the vibratory linear feeders 121A, 122A can be determined, and the degree of soiling of the vibratory linear feeders 121A, 122A can be determined.

Stopping of conveyance as used herein means that shreds P is not conveyed by the vibratory linear feeders 121A, 122A, and the specific amount of shreds P has not accumulated on the first storage hopper 140A when the specified time (T1) has passed.

Prediction of conveyance stopping as used herein means, for example, that the vibratory linear feeders 121A, 122A are soiled, the conveyance speed of shreds P by the vibratory linear feeders 121A, 122A is slower than during normal operation, and the conveyance amount of the vibratory linear feeders 121A, 122A per unit time is slower than during normal operation. When the conveyance speed of shreds P by the vibratory linear feeders 121A, 122A slows, the time required for the specific amount (weight W1) of shreds P to accumulate on the first storage hopper 140A increases. Therefore, stopping of conveyance can be predicted by evaluating the time required for the specific amount (weight W1) of shreds P to accumulate on the first storage hopper 140A.

In addition, because the weight of shreds P accumulated on the first storage hopper 140A when the specified time (T1) has passed is lighter when the conveyance amount per unit time of the vibratory linear feeders 121A, 122A decreases, stopping of conveyance can be predicted by evaluating the weight of new shreds P accumulated on the first storage hopper 140A when the specified time (T1) has passed.

The monitoring device 135 acquires the weight of shreds P stored on the storage hopper 140 that is measured by the load cell 142, and the time counted by the timing device 145, determines if conveyance by the vibratory linear feeders 121A, 122A stopping is indicated, and based thereon stopping of conveyance by the vibratory linear feeders 121A, 122A will be predicted. If the stopping of conveyance by the vibratory linear feeders 121A, 122A is predicted, the monitoring device 135 starts(activates) the first and second cleaning devices 170A1 and 170B1.

In other words, when the conveyance speed of feedstock (shreds P) by the feedstock supply units 101 and 102 becomes slower than during normal operation, the monitoring device 135 predicts the stopping of conveyance by the feedstock supply units 101 and 102, and starts the first and second cleaning devices 170A1 and 170B1.

More specifically, if the time required for the specific amount (weight W1) of shreds P to accumulate on the first storage hopper 140A becomes longer than the specific value (time T2), the monitoring device 135 predicts that conveyance by the vibratory linear feeders 121A, 122A will stop, and starts the first and second cleaning devices 170A1 and 170B1.

In this embodiment, time T2 is set to 6.6 seconds, and is therefore 0.6 seconds (approximately 10%) longer than the specified time T1 (6 seconds). Note that time T2 may be any time appropriately longer than the specified time T1 (6 seconds).

In addition, if when the specified time (T1) has passed the weight of new shreds P accumulated on the first storage hopper 140A is lighter than the specific value (weight W2), the monitoring device 135 predicts that conveyance by the vibratory linear feeders 121A, 122A will stop, and starts the first and second cleaning devices 170A1 and 170B1.

In this embodiment, weight W2 is set to 2.9 g, and is therefore approximately 0.3 g (approximately 10%) lighter than the specified weight W1 (3.2 g). Note that weight W2 may be any weight appropriately lighter than the specified weight W1 (3.2 g).

More specifically, if the time required for the specific amount (weight W1) of shreds P to accumulate on the first storage hopper 140A becomes longer than the specific value (time T2), is longer than the specified time (T1), or the weight of new shreds P accumulated on the first storage hopper 140A is lighter than the specific value (weight W2), the monitoring device 135 predicts that conveyance by the vibratory linear feeders 121A, 122A will stop, and starts the first and second cleaning devices 170A1 and 170B1.

In other words, a measuring device (load cell 142, timing device 145) measures the weight of feedstock (shreds P) and the time required for the weight of feedstock (shreds P) to reach a specific amount (weight W1), and the monitoring device 135 starts the first and second cleaning devices 170A1 and 170B1 if the time until the weight of feedstock (shreds P) reaches a specific amount (weight W1) exceeds the specific value (time T2).

In addition, if the measuring device (load cell 142, timing device 145) measures the weight of new feedstock (shreds P) accumulated when the specified time (T1) has passed and the weight of new feedstock (shreds P) accumulated in the storage hopper 140 does not exceed a specific value (weight W2) by the time the specified time (T1) has passed, the monitoring device 135 starts the first and second cleaning devices 170A 1 and 170 61.

When the monitoring device 135 starts the first cleaning device 170A1, the nozzle 171 of the first cleaning device 170A1 sprays the entire conveyance surface of the vibratory linear feeders 121A, 122A with gas. As a result, contaminants are removed from the conveyance surface of the vibratory linear feeders 121A, 122A, and stopping of conveyance of feedstock by the vibratory linear feeders 121A, 122A can be preemptively prevented.

When the monitoring device 135 starts the first cleaning device 170B1, the nozzle 171 of the first cleaning device 170B1 sprays the entire storage surface of the first storage hopper 140A with gas. As a result, contaminants are removed from the entire storage surface of the first storage hopper 140A, and stopping of conveyance of feedstock by the first storage hopper 140A can be preemptively prevented.

In other words, when the monitoring device 135 starts the first and second cleaning devices 170A1 and 170B1, the first and second cleaning devices 170A1 and 170B1 sprays gas from the nozzles 171 over the vibratory linear feeders 121A, 122A and the first storage hopper 140A in a cleaning process that preemptively prevents stopping of feedstock conveyance by the vibratory linear feeders 121A, 122A and the first storage hopper 140A. The cleaning process is a process of discharging gas from the nozzle 171 of at least one of the vibratory linear feeders 121A, 122A and the first storage hopper 140A.

Note that when the monitoring device 135 may be configured to start only the first cleaning device 170A1 when stopping of conveyance by the vibratory linear feeders 121A, 122A is predicted. When only the first cleaning device 170A1 starts, a cleaning process that preemptively prevents conveyance by the vibratory linear feeders 121A, 122A from stopping is executed.

Furthermore, if both of the first and second cleaning devices 170A1 and 170B1 are started, a cleaning process that preemptively prevents conveyance by the first storage hopper 140A from stopping is executed in addition to a cleaning process that preemptively prevents conveyance by the vibratory linear feeders 121A, 122A from stopping.

Note that the gas discharged from the nozzle 171 is preferably air or nitrogen.

The specific value (time T2) is set in this embodiment so that stopping of conveyance in the vibratory linear feeders 121A, 122A is predicted when soiling of the conveyance surface of the vibratory linear feeders 121A, 122A is slight (when soiling by contaminants is slight).

Because contaminants can be removed more easily when soiling by contaminants is slight than when soiling by contaminants is extreme, contaminants accreting on the conveyance surface of the vibratory linear feeders 121A, 122A can be removed by spraying gas from the nozzles 171 to the entire conveyance surface of the vibratory linear feeders 121A, 122A.

Furthermore, because desirably removing contaminants is more difficult when soiling by contaminants is extreme than when soiling by contaminants is slight, some contaminants may remain on the conveyance surface of the vibratory linear feeders 121A, 122A even if the entire conveyance surface of the vibratory linear feeders 121A, 122A is sprayed with gas.

The effect of contaminants is greater, and contaminants accrete more easily, on the upstream side in the conveyance direction of the feedstock (coarse product D or shreds P) than on the downstream side in the conveyance direction of feedstock. As a result, the vibratory linear feeders 121A, 122A located on the upstream side in the conveyance direction of the feedstock are more easily soiled than the storage hopper 140 located on the downstream side in the conveyance direction of the feedstock, and feedstock conveyance is more easily stopped.

In addition, when stopping of conveyance at the vibratory linear feeders 121A, 122A is predicted, the storage hopper 140 may also be supposed to be soiled by contaminants even though the degree of soiling is less than soiling of the vibratory linear feeders 121A, 122A.

As a result, if stopping of conveyance in the vibratory linear feeders 121A, 122A is predicted in this embodiment, the monitoring device 135 activates both of the first and second cleaning devices 170A1 and 170B1, and in addition to the cleaning process that preemptively prevents stopping of conveyance by the vibratory linear feeders 121A, 122A, executes the cleaning process that preemptively prevents stopping of conveyance at the first storage hopper 140A.

When stopping of conveyance in the vibratory linear feeders 121A, 122A is predicted, and the cleaning process that preemptively prevents stopping of conveyance at the first storage hopper 140A executes in addition to the cleaning process that preemptively prevents stopping of conveyance by the vibratory linear feeders 121A, 122A, contaminants remaining on the surface of the storage hopper 140 on which the shreds P collect are removed, and, in addition to the vibratory linear feeders 121A, 122A, the storage hopper 140 can be maintained in a normal conveyance state.

In other words, the monitoring device 135 activates the first cleaning devices 170A1 and 170B1 when stopping of conveyance of feedstock (coarse product D or shreds P) in the first feedstock supply unit 101 is predicted, and the first and second cleaning devices 170A1 and 170B1 execute a cleaning process that preemptively prevents stopping of conveyance by at least one of the vibratory linear feeders 121A, 122A and the first storage hopper 140A.

The cleaning process that preemptively prevents stopping of conveyance is executed automatically by the first and second cleaning devices 170A1 and 170B1, making executing the cleaning process more efficient (reduces labor) compared with a configuration in which the operator manually executes the cleaning process.

In addition, when a cleaning process that preemptively prevents stopping of conveyance executes, there is soiling by contaminants, the cleaning time can be shortened, the time that defibrated material can be produced can be increased, and the productivity (operation rate) of the defibrated material manufacturing device 100 can be improved.

Yet further, because adverse effects from contaminants can be eliminated sooner if the cleaning process that preemptively prevents stopping of conveyance executes when soiling by contaminants is light, it is also more difficult for severe problems such as malfunctions caused by contaminants to occur. As a result, system down time is shortened compared with when severe problems such as malfunctions caused by contaminants occur, defibrated material can be produced for a longer time, and the productivity (operation rate) of the defibrated material manufacturing device 100 can be improved.

The second feedstock supply unit 102 operates the same as the first feedstock supply unit 101. That is, the monitoring device 135 activates the first and second cleaning devices 170A2, 170B2 when stopping conveyance of feedstock (coarse product D or shreds P) in the second feedstock supply unit 102 is predicted, and the first and second cleaning devices 170A2, 170B2 execute the cleaning process that preemptively prevents stopping of conveyance on at least one of vibratory linear feeders 121B, 122B and storage hopper 140B.

This configuration has the same effect in the second feedstock supply unit 102 as in the first feedstock supply unit 101.

In this embodiment, if the monitoring device 135 predicts conveyance of feedstock by the first feedstock supply unit 101 will stop and activates the first and second cleaning devices 170A1 and 170B1 while feedstock (shreds P) is being supplied to the defibrator 160 by the first feedstock supply unit 101 and the second feedstock supply unit 102, the controller 130 stops supplying feedstock by the first feedstock supply unit 101 only, and after applying of the cleaning process to the first feedstock supply unit 101, resumes supplying feedstock by the first feedstock supply unit 101. In other words, in this condition, only the first feedstock supply unit 101 stops supplying feedstock from the first feedstock supply unit 101, and after applying of the cleaning process to the first feedstock supply unit 101, the first feedstock supply unit 101 resumes supplying feedstock from the first feedstock supply unit 101, under control of the controller 130.

In addition, if the monitoring device 135 predicts conveyance of feedstock by the second feedstock supply unit 102 will stop and activates the first and second cleaning devices 170A2 and 170B2 while feedstock (coarse product D, shreds P) is being supplied to the defibrator 160 by the first feedstock supply unit 101 and the second feedstock supply unit 102, the controller 130 stops supplying feedstock by the second feedstock supply unit 102 only, and after applying of the cleaning process to the second feedstock supply unit 102, resumes supplying feedstock by the second feedstock supply unit 102. In other words, in this condition, only the second feedstock supply unit 102 stops supplying feedstock from the second feedstock supply unit 102, and after applying of the cleaning process to the second feedstock supply unit 102, the second feedstock supply unit 102 resumes supplying feedstock from the second feedstock supply unit 102, under control of the controller 130.

Because this configuration does not simultaneously stop both of the feedstock supply units 101 and 102 and continuously supplies feedstock for defibrated material to the defibrator 160 from at least one of the feedstock supply units 101 and 102, the defibrated material manufacturing device 100 can continuously supply feedstock (defibrated material) for a sheet S to the recycled paper manufacturing system 200.

Therefore, the sheet manufacturing apparatus 1000 (recycled paper manufacturing system 200) can continuously manufacture sheets S. As a result, the time the sheet manufacturing apparatus 1000 completely stops sheet S production is shortened, and the productivity (operation rate) of the sheet manufacturing apparatus 1000 can be improved compared with a configuration in which the time the sheet manufacturing apparatus 1000 completely stops sheet S production is long.

Furthermore, if the recycled paper manufacturing system 200 of the sheet manufacturing apparatus 1000 manufactures sheets S continuously and the recycled paper manufacturing system 200 operates stably, the recycled paper manufacturing system 200 can more easily produce sheets S of consistent quality, and the stability of the quality of the sheets S can be improved.

In this embodiment, if the cleaning process is applied to the first feedstock supply unit 101, and after supply of feedstock (coarse product D or shreds P) by the first feedstock supply unit 101 resumes, the time until the specific amount (weight W1) of shreds P accumulates on the first storage hopper 140A becomes longer than the specific value (time T2), the cleaning process of the first feedstock supply unit 101 may be determined insufficient. As a result, the controller 130 displays on the operating panel 190 a message reporting to the operator that the time required for the weight of feedstock (shreds P) accumulated on the first storage hopper 140A to reach the specific amount (weight W1) exceeds the specific value (time T2).

In addition, as with the first feedstock supply unit 101, if stopping of conveyance by the second feedstock supply unit 102 is predicted after the cleaning process is applied to the second feedstock supply unit 102, a message indicating that cleaning is insufficient is displayed on the operating panel 190.

In other words, the defibrated material manufacturing device 100 has a reporting device (operating panel 190) that reports a specific value has been exceeded when the time required for the weight of feedstock (shreds P) accumulated on the storage hopper 140 to reach the specific amount (weight W1) exceeds the specific value (time T2), or a reporting device (operating panel 190) that reports the specific value has not been exceeded when the weight of new feedstock (shreds P) accumulated on the storage hopper 140 does not exceed the specific value (weight W2) when the specified time (T1) has passed, after the cleaning process is applied to the first feedstock supply unit 101 and supply of feedstock by the first feedstock supply unit 101 has resumed, or after the cleaning process is applied to the second feedstock supply unit 102 and supply of feedstock by the second feedstock supply unit 102 has resumed.

When a message reporting insufficient cleaning is displayed on the operating panel 190, the operator stops the defibrated material manufacturing device 100, checks the status of the feedstock supply units 101 and 102, and repeats the cleaning process on the feedstock supply units 101 and 102. In addition, if a message reporting insufficient cleaning is again displayed on the operating panel 190 after repeating the cleaning process, the operator may determine there is a problem (malfunction) in the defibrated material manufacturing device 100, stop the defibrated material manufacturing device 100, and take appropriate action to resolve the problem (such as a part replacement or overhaul).

By thus displaying a message reporting insufficient cleaning on the operating panel 190, the operator can quickly know there is a problem with insufficient cleaning, and can quickly take appropriate action to resolve the problem.

Note the embodiment is not limited to a configuration that displays a message reporting insufficient cleaning on an operating panel 190. For example, the defibrated material manufacturing device 100 may have a PATLITE® or buzzer, and be configured to report insufficient cleaning to the operator by light from the Patlite or sounding the buzzer.

Second Embodiment

Figure 6:
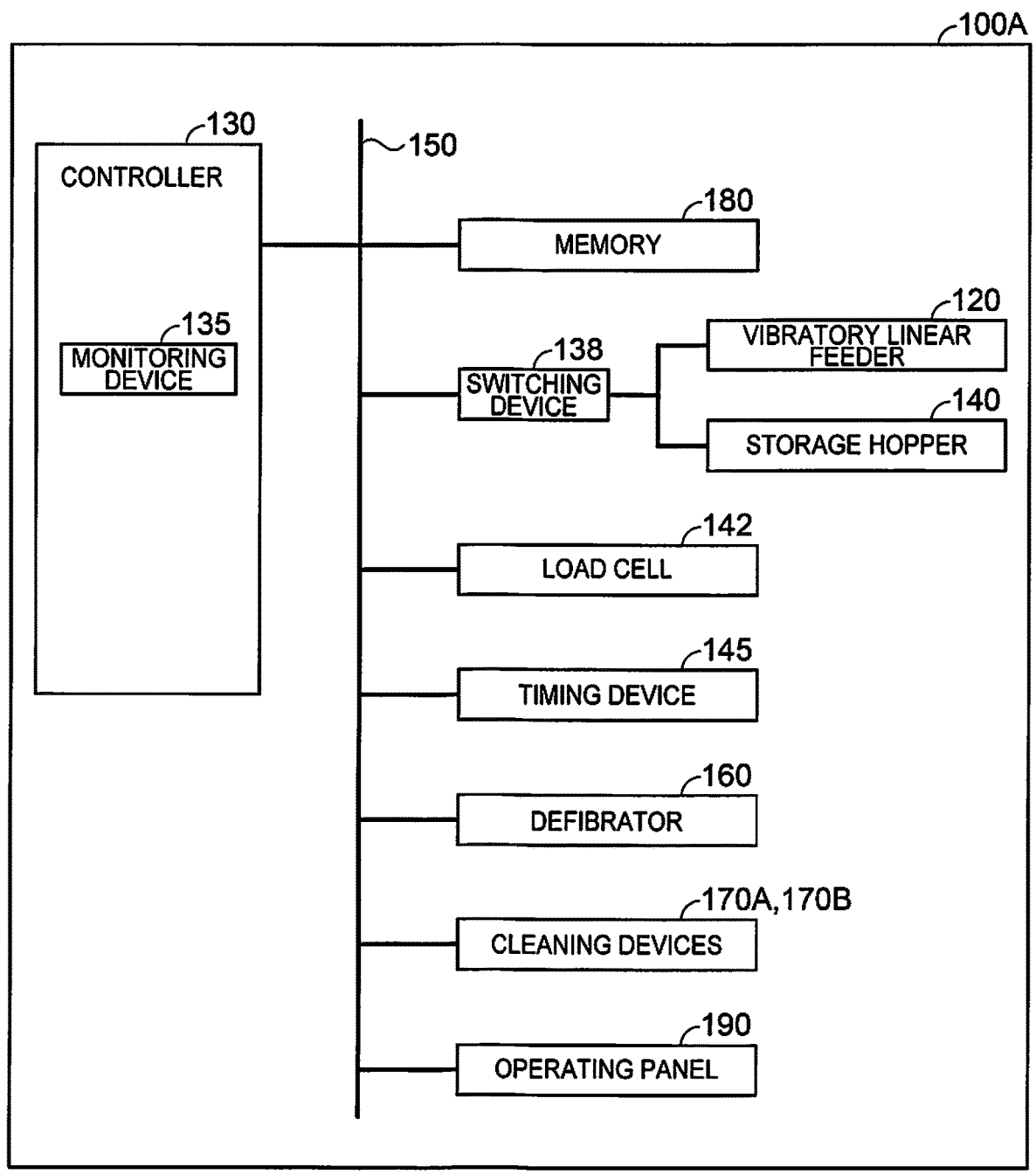
FIG. 6 is a block diagram of a control configuration of a defibrated material manufacturing device according to a second embodiment.

FIG. 6 is a block diagram illustrating the control configuration of a defibrated material manufacturing device according to a second embodiment.

The configuration of the recycled paper manufacturing system 200 is the same in this embodiment and the first embodiment, but the configuration of the defibrated material manufacturing device is different. More specifically, this embodiment and the first embodiment differ in that the sheet manufacturing apparatus 100A according to this embodiment also has a switching device 138.

In addition, in the first embodiment, shreds P are supplied as the feedstock of the defibrated material to the defibrator 160 from both the first feedstock supply unit 101 and the second feedstock supply unit 102. In this embodiment, shreds P are supplied as the feedstock of the defibrated material to the defibrator 160 from either the first feedstock supply unit 101 or the second feedstock supply unit 102. This embodiment differs from the first embodiment in this respect.

A sheet manufacturing apparatus 100A according to this embodiment is described below with reference to FIG. 6 and focusing on the differences with the first embodiment. The same parts in this embodiment and the first embodiment are also identified by like reference numeral, and redundant description is omitted.

As shown in FIG. 6, the sheet manufacturing apparatus 100A has the controller 130, memory 180, a switching device 138, the vibratory linear feeder 120, the storage hopper 140, the load cell 142, the timing device 145, the defibrator 160, the first and second cleaning devices 170A and 170B, and the operating panel 190. The controller 130, the memory 180, the switching device 138, the vibratory linear feeder 120, the storage hopper 140, the load cell 142, the timing device 145, the defibrator 160, the first and second cleaning devices 170A, 170B, and the operating panel 190 are communicatively connected through a bus 150.

The controller 130 has the monitoring device 135 as a function unit embodied by software (a program) stored in the memory 180.

The switching device 138 is a switch that changes between operation of the vibratory linear feeders 121A, 122A and the first storage hopper 140A, and operation of the vibratory linear feeder 121B, 122B and the second storage hopper 140B. As one example, at least one of the first storage hopper 140A and the second storage hopper 140B can have the switching device 138.

Based on a signal from the monitoring device 135, the switching device 138 switches from a state operating the vibratory linear feeders 121A, 122A and the first storage hopper 140A, to a state operating the vibratory linear feeder 121B, 122B and the second storage hopper 140B. As a result, operation changes from operating of the first feedstock supply unit 101 to operating of the second feedstock supply unit 102.

Also based on a signal from the monitoring device 135, the switching device 138 switches from a state in which the vibratory linear feeder 121B, 122B and the second storage hopper 140B are operating, to a state in which the vibratory linear feeders 121A, 122A and the first storage hopper 140A are operating. As a result, operation switches from operating of the second feedstock supply unit 102 to operating of the first feedstock supply unit 101.

In other words, the switching device 138 is a switch that changes between operation of the first feedstock supply unit 101 and operation of the second feedstock supply unit 102, and operation therefore changes between operation of the first feedstock supply unit 101 and operation of the second feedstock supply unit 102 according to the state of the switching device 138.

In the sheet manufacturing apparatus 100A according to this embodiment, shreds P is supplied as defibrated material feedstock to the defibrator 160 from either the first feedstock supply unit 101 or the second feedstock supply unit 102. Operation of the first feedstock supply unit 101 and operation of the second feedstock supply unit 102 is changed by the switching device 138.

The description below supposes that shreds P are supplied as the defibrated material feedstock from the first feedstock supply unit 101.

If the monitoring device 135 predicts conveyance of feedstock by the first feedstock supply unit 101 will stop while shreds P are being supplied from the first feedstock supply unit 101 as defibrated material feedstock to the defibrator 160, that is, if the monitoring device 135 predicts the stopping of conveyance in the vibratory linear feeders 121A, 122A, the monitoring device 135 sends to the switching device 138 a signal to switch the operation of the feedstock supply units 101 and 102. The switching device 138, based on the signal from the monitoring device 135, then changes from a state in which shreds P are supplied from the first feedstock supply unit 101 to the defibrator 160 to a state in which the shreds P are supplied from the second feedstock supply unit 102 to the defibrator 160.

After switching so that feedstock (shreds P) is supplied by the second feedstock supply unit 102 to the defibrator 160, the monitoring device 135 starts(activates) the first and second cleaning devices 170A1 and 170B1, and the first and second cleaning devices 170A1 and 170B1 execute the cleaning process that preemptively prevents stopping of conveyance by the first feedstock supply unit 101 to at least one of vibratory linear feeders 121A, 122A and the first storage hopper 140A.

If after changing so that feedstock (shreds P) is supplied by the second feedstock supply unit 102 to the defibrator 160, the monitoring device 135 predicts stopping of conveyance by the second feedstock supply unit 102, that is, if the monitoring device 135 predicts the stopping of conveyance in the vibratory linear feeders 121B, 122B, the monitoring device 135 sends to the switching device 138 a signal to switch the operation of the feedstock supply units 101 and 102. The switching device 138, based on the signal from the monitoring device 135, then changes from a state in which shreds P are supplied from the second feedstock supply unit 102 to the defibrator 160 to a state in which the shreds P are supplied from the first feedstock supply unit 101 to the defibrator 160.

After switching so that feedstock (shreds P) is supplied by the first feedstock supply unit 101 to the defibrator 160, the monitoring device 135 starts(activates) the first and second cleaning devices 170A2 and 170B2, and the first and second cleaning devices 170A2 and 170B2 execute the cleaning process that preemptively prevents stopping of conveyance by the second feedstock supply unit 102 to at least one of vibratory linear feeders 121B, 122B and storage hopper 140B.

As described above, because supplying shreds P from one of feedstock supply units 101 and 102 to the defibrator 160 is maintained, and defibrated material feedstock (shreds P) is consistently supplied to the defibrator 160 in the sheet manufacturing apparatus 100A according to this embodiment, the defibrated material manufacturing device 100 can continuously supply sheet S feedstock (defibrated material) to the recycled paper manufacturing system 200.

Therefore, the sheet manufacturing apparatus 1000 (recycled paper manufacturing system 200) can continuously manufacture sheets S. As a result, the time the sheet manufacturing apparatus 1000 completely stops sheet S production is shortened, and the productivity of the sheet manufacturing apparatus 1000 can be improved compared with a configuration in which the time the sheet manufacturing apparatus 1000 completely stops sheet S production is long.

Furthermore, if the recycled paper manufacturing system 200 of the sheet manufacturing apparatus 1000 manufactures sheets S continuously, the recycled paper manufacturing system 200 can more easily produce sheets S of consistent quality than if the recycled paper manufacturing system 200 manufactures sheets S intermittently, and the stability of the quality of the sheets S can be improved.

The invention is not limited to the foregoing embodiments, can be varied in many ways without departing from the scope and concept of the invention as will be understood from the accompanying claims and foregoing description, and various modifications of the foregoing embodiments are conceivable. Examples of some variations are described below.

First Variation

The embodiments described above predict stopping of conveyance by evaluating the time required for the specific amount (weight W1) of shreds P to accumulate on the first storage hopper 140A, or the weight of the new shreds P accumulated on the first storage hopper 140A when a specified time (T1) has passed, but the prediction is not limited to the embodiments.

For example, a configuration that predicts the stopping of conveyance by evaluating the conveyance speed of the shreds P is also conceivable. Further alternatively, a configuration that predicts the stopping of conveyance by monitoring a condition of the conveyed shreds P (such as clumping of the shreds P) is also conceivable. Yet further alternatively, a configuration that predicts the stopping of conveyance by evaluating the load (such as the drive current) of the motor that drives the vibratory linear feeders 121 and 122, or the load of the motor that drives the storage hopper 140, is also conceivable.

Second Variation

In the embodiments described above, the first and second cleaning devices 170A and 170B that preemptively prevents stopping of conveyance remove contaminants by discharging gas from the nozzle 171, but the cleaning devices are not limited to the embodiments.

For example, the cleaning device that preemptively prevents stopping of conveyance may be a configuration that has a cleaning member such as a sticky sheet, a brush, or a bar, and removes contaminants by means of the cleaning member. Further alternatively, the cleaning device that preemptively prevents stopping of conveyance may be a configuration that has a suction device, and removes contaminants by means of the suction device.

Third Variation

The defibrated material manufacturing device 100 in the embodiments described above does not have a shredder or other type of mill, receives coarse product D shredded by a device separate from the defibrated material manufacturing device 100, and produces defibrated material (feedstock for sheets S) from the coarse product D, but the defibrated material manufacturing device 100 is not limited to the embodiments. The defibrated material manufacturing device 100 may be a configuration incorporating a shredder or other type of mill.

Fourth Variation

The embodiment described above has two feedstock supply units that supply feedstock for defibrated material to the defibrator 160, but the number of feedstock supply units may be less than two or more than two. More specifically, the number of feedstock supply units may be adjusted so that the processing capacity of the feedstock supply units equals the processing capacity of the defibrator 160.

Fifth Variation

A sheet as used herein refers to paper (print media) suitable for forming images by ink discharged from nozzles of a printing device, for example. However, a sheet as referred to herein is a medium formed from fiber molded in a specific form, and is not limited to paper used for printing by a printing device. For example, the sheet may be a fluid absorbent medium or sound absorbent medium of fiber shaped in a specific form. For example, a sheet according to the invention may also be a nonwoven cloth or fiber board of fiber shaped in a specific form.

Therefore, a sheet manufacturing apparatus according to the invention is not limited to a manufacturing apparatus (sheet manufacturing apparatus 1000) that manufactures paper suitable to use in a printing device, and may be a manufacturing apparatus that manufactures moldings of fiber shaped in a specific form, including fluid absorbent media, sound absorbent media, nonwoven cloth, and fiber board. The defibrated material manufacturing device 100 can be desirably adapted to a manufacturing apparatus that manufactures moldings of fiber shaped in a specific form, including fluid absorbent media, sound absorbent media, nonwoven cloth, and fiber board.

EXAMPLES

Example 1

A defibrated material manufacturing device according to this aspect of an example includes: a defibrator configured to defibrate feedstock containing fiber and produce defibrated material; a feedstock supply unit configured to supply the feedstock to the defibrator; a monitoring device; and a cleaning device. The feedstock supply unit including a conveyance device configured to convey the feedstock; a storage device configured to accumulate the feedstock conveyed from the conveyance device, and supply the feedstock to the defibrator; and a measuring device configured to measure a state of the feedstock accumulated on the storage device. When the conveyance speed of the feedstock by the feedstock supply unit becomes slower than during normal operation, the monitoring device predicts stopping of conveyance of the feedstock by the feedstock supply unit and activates the cleaning device, and the cleaning device executes on at least one of the conveyance device and the storage device a cleaning process that preemptively prevents stopping of conveyance.

Because the monitoring device predicts stopping of conveyance of feedstock by the feedstock supply unit when the feedstock conveyance speed in the feedstock supply unit (conveyance device, storage device) becomes slower than during normal operation, and the cleaning device executes a cleaning process that preemptively prevents stopping of conveyance of feedstock, problems such as conveyance of feedstock stopping are prevented and the down time (the time when defibrated material cannot be produced) of the device caused by such problems is shortened.

In addition, when stopping of feedstock conveyance is predicted, deterioration of the feedstock supply unit is less than when conveyance of feedstock actually stops, the feedstock supply unit can be restored to normal operating condition in a short time, and the down time of the defibrated material manufacturing device (the time when defibrated material cannot be produced) is shortened.

Compared with a configuration in which the problem of feedstock conveyance stopping is resolved after the problem occurs, a configuration that preemptively prevents the problem of feedstock conveyance stopping shortens the time for which defibrated material cannot be produced, increases the time that defibrated material can be produced, and improves the productivity (operation rate) of the defibrated material manufacturing device.

Note that below the conveyance of feedstock stopping is referred to simply as conveyance stopping.

Example 2

Preferably in the defibrated material manufacturing device described above, the cleaning device has a nozzle to discharge a fluid; and the cleaning process is a process of discharging the fluid from the nozzle to at least one of the conveyance device and the storage device.

If, when stopping of conveyance is predicted in at least one of the conveyance device and storage device, fluid is discharged from the nozzle of the cleaning device to at least one of the conveyance device and storage device, and the cause (foreign matter, soiling, for example) of conveyance stopping is removed, stopping of conveyance can be preemptively stopped in at least the one of the conveyance device and storage device.

Example 3

Preferably in the defibrated material manufacturing device described above, the measuring device measures a weight of the feedstock accumulated on the storage device, and a time until the weight of the feedstock reaches a specific amount; and the monitoring device activates the cleaning device when the time exceeds a specific value.

The storage device accumulates feedstock conveyed from the conveyance device, and supplies a specific amount of feedstock to the defibrator, for example. The measuring device measures a condition (such as the weight of feedstock) stored on the storage device. When the specific amount of feedstock has accumulated in the storage device, the specific amount of feedstock is supplied from the storage device to the defibrator.

When supplying feedstock from the conveyance device to the storage device becomes difficult in a defibrated material manufacturing device thus comprised, the time required to accumulate the specific amount of feedstock in the storage device increases. In addition, when the difficulty of supplying feedstock from the conveyance device to the storage device increases further, conveyance may stop and feedstock will not be supplied from the conveyance device to the storage device.

As a result, if the time until the weight of the feedstock stored in the storage device reaches a specific amount is measured, and the time until the weight of the feedstock stored in the storage device reaches a specific amount increases, that supplying feedstock from the conveyance device to the storage device has become difficult can be determined and used as an indicator that conveyance will stop, and the stopping of conveyance can therefore be predicted.

Therefore, if the time until the weight of the feedstock stored in the storage device reaches a specific amount exceeds a specific value, that is, the time until the weight of the feedstock stored in the storage device reaches a specific amount becomes long, stopping of conveyance is predicted, and the monitoring device preferably activates the cleaning device, and a cleaning process that preemptively prevents stopping of conveyance is executed.

Example 4

Preferably in the defibrated material manufacturing device described above, the measuring device measures a weight of feedstock newly accumulated on the storage device and time from when the feedstock was newly accumulated on the storage device; and the monitoring device activates the cleaning device when the weight of feedstock newly accumulated on the storage device has not reached a specific value when the time has passed a specific time.

The storage device accumulates feedstock conveyed from the conveyance device, and supplies a specific amount of feedstock to the defibrator, for example. The measuring device measures a condition of new feedstock (such as the weight of the feedstock) stored in the storage device when a specific time has passed. When the specific amount of feedstock has accumulated in the storage device, the specific amount of feedstock is supplied from the storage device to the defibrator.

In a defibrated material manufacturing device thus comprised, when supplying feedstock from the conveyance device to the storage device becomes difficult, the amount of new feedstock accumulated in the storage device is lighter when the specific time has passed. In addition, when the difficulty of supplying feedstock from the conveyance device to the storage device increases further, conveyance may stop and feedstock will not be supplied from the conveyance device to the storage device.

As a result, the measuring device measures the weight of feedstock newly accumulated on the storage device and the time from when new feedstock started accumulating on the storage device. When the weight of feedstock newly accumulated on the storage device has not reached a specific value when the measured time has passed a specific time, such as the weight of new feedstock accumulated on the storage device is lighter when the specific time has passed, the monitoring device can determine that supplying feedstock from the conveyance device to the storage device has become difficult and use this as an indicator that conveyance will stop, and can therefore predict that conveyance will stop.

Therefore, if the weight of new feedstock accumulated in the storage device has not reached the specific value when the time has reached the specific time, that is, when the weight of new feedstock accumulated on the storage device is light when the specific time has passed, stopping of conveyance is predicted, and the monitoring device preferably activates the cleaning device, and a cleaning process that preemptively prevents stopping of conveyance is executed.

Example 5

Preferably in the defibrated material manufacturing device described above, the feedstock supply unit includes a first feedstock supply unit and a second feedstock supply unit. When the monitoring device predicts stopping of conveyance in the first feedstock supply unit while the feedstock is being supplied to the defibrator by the first feedstock supply unit and the second feedstock supply unit, the feedstock supply unit stops only supplying the feedstock by the first feedstock supply unit, executes the cleaning process on the first feedstock supply unit, and then resumes supplying the feedstock by the first feedstock supply unit; and when the monitoring device predicts stopping of conveyance in the second feedstock supply unit while the feedstock is being supplied to the defibrator by the first feedstock supply unit and the second feedstock supply unit, the feedstock supply unit stops only supplying the feedstock by the second feedstock supply unit, executes the cleaning process on the second feedstock supply unit, and then resumes supplying the feedstock by the second feedstock supply unit.

If the monitoring device predicts the stopping of conveyance in the first feedstock supply unit while feedstock is being supplied from the first feedstock supply unit and the second feedstock supply unit to the defibrator, supplying feedstock by the first feedstock supply unit only stops, supplying feedstock by the second feedstock supply unit does not stop, and the cleaning process is executed on the first feedstock supply unit. As a result, compared with a configuration that stops both the first feedstock supply unit and the second feedstock supply unit to execute the cleaning process, the time that defibrated material can be produced increases, and the productivity (operation rate) of the defibrated material manufacturing device can be improved.

If the monitoring device predicts the stopping of conveyance in the second feedstock supply unit while feedstock is being supplied from the first feedstock supply unit and the second feedstock supply unit to the defibrator, supplying feedstock by the second feedstock supply unit only stops, supplying feedstock by the first feedstock supply unit does not stop, and the cleaning process is executed on the second feedstock supply unit. As a result, compared with a configuration that stops both the first feedstock supply unit and the second feedstock supply unit to execute the cleaning process, the time that defibrated material can be produced increases, and the productivity (operation rate) of the defibrated material manufacturing device can be improved.

Example 6

Preferably, the defibrated material manufacturing device described above also has a reporting device configured to report, after the cleaning process is executed on the first feedstock supply unit and supplying feedstock by the first feedstock supply unit has resumed, or after the cleaning process is executed on the second feedstock supply unit and supplying feedstock by the second feedstock supply unit has resumed, that the time exceeds the specific value when the time exceeds the specific value, or that the weight of feedstock does not exceed the specific value when the weight of new feedstock stored on the storage device does not exceed the specific value when the specific time has passed.

If the monitoring device predicts stopping of conveyance in the first feedstock supply unit, the cleaning process is applied to the first feedstock supply unit, feedstock supply by the first feedstock supply unit resumes, and the time until the weight of the feedstock reaches a specific amount then exceeds a specific value, that the cause (foreign matter, soiling, for example) of conveyance stopping was not suitably removed can be determined.

In addition, if the monitoring device predicts stopping of conveyance in the first feedstock supply unit, the cleaning process is applied to the first feedstock supply unit, feedstock supply by the first feedstock supply unit resumes, and the weight of new feedstock accumulated in the storage device does not exceed a specific value when the specific time has passed, that the cause (foreign matter, soiling, for example) of conveyance stopping was not suitably removed can be determined.

Furthermore, if the monitoring device predicts stopping of conveyance in the second feedstock supply unit, the cleaning process is applied to the second feedstock supply unit, feedstock supply by the second feedstock supply unit resumes, and the time until the weight of the feedstock reaches a specific amount then exceeds a specific value, that the cause (foreign matter, soiling, for example) of conveyance stopping was not suitably removed can be determined.

In addition, if the monitoring device predicts stopping of conveyance in the second feedstock supply unit, the cleaning process is applied to the second feedstock supply unit, feedstock supply by the second feedstock supply unit resumes, and the weight of new feedstock accumulated in the storage device does not exceed a specific value when the specific time has passed, that the cause (foreign matter, soiling, for example) of conveyance stopping was not suitably removed can be determined.

Because the reporting device reports that the cause of conveyance stopping was not suitably removed, the operator can quickly know that the cause of conveyance stopping was not suitably removed, and can quickly execute a process to remove the cause of conveyance stopping.

Example 7

Preferably in the defibrated material manufacturing device described above, the feedstock supply unit includes a first feedstock supply unit and a second feedstock supply unit. When the monitoring device predicts stopping of conveyance in the first feedstock supply unit while the feedstock is being supplied to the defibrator by the first feedstock supply unit, the feedstock supply unit changes to supplying the feedstock to the defibrator by the second feedstock supply unit, and then executes the cleaning process on the first feedstock supply unit.

If the monitoring device predicts stopping of conveyance by the first feedstock supply unit while feedstock is being supplied by the first feedstock supply unit to the defibrator, supplying feedstock to the defibrator is changed to the second feedstock supply unit, and the cleaning process is then executed on the first feedstock supply unit, the cleaning process can be executed while continuing to supply feedstock to the defibrator. Compared with a configuration that executes the cleaning process after stopping supplying feedstock to the defibrator, this aspect of the examples can increase the time that defibrated material can be produced, and improve the productivity (operation rate) of the defibrated material manufacturing device.

Example 8

Preferably in the defibrated material manufacturing device described above, when the monitoring device predicts stopping of conveyance in the second feedstock supply unit after changing to supplying the feedstock to the defibrator by the second feedstock supply unit, the feedstock supply unit changes to supplying the feedstock to the defibrator by the first feedstock supply unit on which the cleaning process was executed, and then executes the cleaning process on the second feedstock supply unit.

If the monitoring device predicts stopping of conveyance by the second feedstock supply unit while feedstock is being supplied by the first feedstock supply unit to the defibrator, supplying feedstock to the defibrator is changed to the first feedstock supply unit, and the cleaning process is then executed on the second feedstock supply unit, the cleaning process can be executed while continuing to supply feedstock to the defibrator. Compared with a configuration that executes the cleaning process after stopping supplying feedstock to the defibrator, this aspect of the example can increase the time that defibrated material can be produced, and improve the productivity (operation rate) of the defibrated material manufacturing device.

Example 9

Preferably in the defibrated material manufacturing device described above, the feedstock includes recovered paper.

The productivity (operation rate) of a defibrated material manufacturing device that defibrates recovered paper to produce defibrated material can be improved even when recovered paper is used as the feedstock.

Example 10

A sheet manufacturing apparatus according to another aspect of the example preferably includes the defibrated material manufacturing device described above.

The defibrated material manufacturing device described above executes a cleaning process that preemptively prevents stopping of conveyance, increases the time that defibrated material can be produced, and improves the productivity (operation rate) of the defibrated material manufacturing device. The time that defibrated material can be produced therefore also be increased, and productivity (operation rate) improved, in a sheet manufacturing apparatus including the defibrated material manufacturing device described above.

Example 11

In another aspect of the example, the sheet manufacturing apparatus described above preferably also has: a mixing device configured to mix the defibrated material supplied from the defibrated material manufacturing device with resin; a web forming device configured to form a web from a mixture of the defibrated material and the resin; and a sheet forming device configured to form a sheet by a process including at least one of compressing and heating the web.

If the sheet manufacturing apparatus includes a defibrated material manufacturing device with improved productivity (operation rate), a mixing device that mixes resin with defibrated material supplied from the defibrated material manufacturing device, a web forming device that forms a web from a mixture of the defibrated material and the resin; and a sheet forming device configured to form a sheet by a process including at least one of compressing and heating the web, the sheet manufacturing time and productivity (operation rate) can also be improved in the sheet manufacturing apparatus.

Other objects and attainments together with a fuller understanding of the embodiments will become apparent and appreciated by referring to the above description and claims taken in conjunction with the accompanying drawings.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A defibrated material manufacturing device comprising:
   a defibrator configured to defibrate feedstock containing fiber and produce defibrated material; and
   a first feedstock supply unit and a second feedstock supply unit that are configured to supply the feedstock to the defibrator, each of the first feedstock supply unit and the second feedstock supply unit including
      a conveyance device configured to convey the feedstock,
      a storage device configured to accumulate the feedstock conveyed from the conveyance device and supply the feedstock to the defibrator, and
      a measuring device configured to measure a weight of the feedstock accumulated on the storage device, the first feedstock supply unit and the second feedstock supply unit alternately supplying the feedstock accumulated on each storage device to the defibrator, when the weight of the feedstock accumulated on the each storage device reaches a specific level.

2. The defibrated material manufacturing device according to claim 1, wherein
the feedstock includes recovered paper.

3. The defibrated material manufacturing device according to claim 1, further comprising
a monitoring device, and
a cleaning device,
the monitoring device being configured to predict stopping of conveyance of the feedstock by the first feedstock supply unit and the second feedstock supply unit and activate the cleaning device in response to a conveyance speed of the feedstock by the first feedstock supply unit and the second feedstock supply unit becoming slower than during normal operation, and
the cleaning device being configured to execute, on at least one of the conveyance device or the storage device, or both, a cleaning process that preemptively prevents the stopping of conveyance.

4. The defibrated material manufacturing device according to claim 3, wherein
the cleaning device has a nozzle configured to discharge a fluid, and
the cleaning device is configured to, as the cleaning process, discharge the fluid from the nozzle to at least one of the conveyance device or the storage device, or both.

5. The defibrated material manufacturing device according to claim 3, wherein
the measuring device is configured to measure the weight of the feedstock accumulated on the storage device, and a time until the weight of the feedstock reaches a specific amount, and
the monitoring device is configured to activate the cleaning device when the time exceeds a specific value.

6. The defibrated material manufacturing device according to claim 3, wherein
the measuring device is configured to measure a weight of feedstock newly accumulated on the storage device and time from when the feedstock is newly accumulated on the storage device, and
the monitoring device is configured to activate the cleaning device when the weight of feedstock newly accumulated on the storage device has not reached a specific value when the time has passed a specific time.

7. A sheet manufacturing apparatus comprising:
the defibrated material manufacturing device according to claim 1.

8. The sheet manufacturing apparatus according to claim 7, further comprising:
a mixing device configured to mix the defibrated material supplied from the defibrated material manufacturing device with resin;
a web forming device configured to form a web from a mixture of the defibrated material and the resin; and
a sheet forming device configured to form a sheet by a process including at least one of compressing and heating the web.

* * * * *